(12) United States Patent
Lee et al.

(10) Patent No.: US 10,992,489 B2
(45) Date of Patent: Apr. 27, 2021

(54) ELECTRONIC DEVICE FOR PROVIDING NOTIFICATION MESSAGE AND METHOD THEREOF

(71) Applicant: SAMSUNG ELECTRONICS CO., LTD., Suwon-si (KR)

(72) Inventors: Jaehyeok Lee, Suwon-si (KR); Taikuin Mun, Suwon-si (KR); Jaehoon Lee, Suwon-si (KR); Jongkeun Choi, Suwon-si (KR)

(73) Assignee: Samsung Electronics Co, , Ltd., Suwon-si (KR)

( * ) Notice: Subject to any disclaimer, the term of this patent is extended or adjusted under 35 U.S.C. 154(b) by 0 days.

(21) Appl. No.: 16/535,683

(22) Filed: Aug. 8, 2019

(65) Prior Publication Data

US 2020/0052922 A1 Feb. 13, 2020

(30) Foreign Application Priority Data

Aug. 8, 2018 (KR) ........................ 10-2018-0092599

(51) Int. Cl.
*H04M 11/04* (2006.01)
*H04L 12/18* (2006.01)
(Continued)

(52) U.S. Cl.
CPC ...... *H04L 12/1895* (2013.01); *H04L 12/2823* (2013.01); *H04L 51/04* (2013.01)

(58) Field of Classification Search
CPC . H04L 12/1895; H04L 51/04; H04L 12/2823; H04L 51/24; H04L 51/00; G06F 1/163; G06F 3/0482; G06Q 10/10
(Continued)

(56) References Cited

U.S. PATENT DOCUMENTS 8,345,586 B2 * 1/2013 Nichols ................. H04W 68/00
370/311
9,721,441 B2 8/2017 Lee et al.
(Continued)

FOREIGN PATENT DOCUMENTS

EP 3 239 806 11/2017
KR 10-2013-0045540 5/2013
(Continued)

OTHER PUBLICATIONS

International Search Report and Written Opinion dated Dec. 27, 2019 in counterpart International Patent Application No. PCT/KR2019/009997.
(Continued)

*Primary Examiner* — Amancio Gonzalez
(74) *Attorney, Agent, or Firm* — Nixon & Vanderhye P.C.

(57) ABSTRACT

An electronic device includes a display, communication circuitry performing wireless connection with an external electronic device, a processor operatively coupled with the display and the communication circuitry, and a memory operatively connected with the processor. Based on executing instructions stored in the memory, the processor is configured to control the electronic device to receive information on a first notification message generated within the external electronic device using the communication circuitry. Based on instructions stored in the memory being executed, the processor controls the electronic device to display the first notification message through the display. Based on the instructions stored in the memory being executed, the processor is configured to control the electronic device to receive one or more second notification messages which have been generated within the external electronic device prior to the first notification message. Based on instructions stored in the memory being executed, the processor is configured to control the electronic device
(Continued)

to display, in response to an input, the second notification message in at least a portion of the display.

6 Claims, 22 Drawing Sheets

(51) Int. Cl.
*H04L 12/28* (2006.01)
*H04L 12/58* (2006.01)

(58) Field of Classification Search
USPC .................................................. 455/404.1
See application file for complete search history.

(56) References Cited

U.S. PATENT DOCUMENTS

| | | | |
|---|---|---|---|
| 9,942,849 B1* | 4/2018 | Hariharan | H04W 4/023 |
| 10,534,900 B2* | 1/2020 | Cheong | A61B 5/681 |
| 2013/0038437 A1 | 2/2013 | Talati et al. | |
| 2015/0319223 A1 | 11/2015 | Deepak Narayana et al. | |
| 2015/0350129 A1 | 12/2015 | Cary et al. | |
| 2016/0142407 A1* | 5/2016 | Chun | H04L 63/0861 726/5 |
| 2016/0277891 A1 | 9/2016 | Dvortsov et al. | |
| 2016/0283020 A1 | 9/2016 | Heo et al. | |
| 2017/0102855 A1 | 4/2017 | Kwon et al. | |

FOREIGN PATENT DOCUMENTS

| | | |
|---|---|---|
| KR | 10-1582266 | 1/2016 |
| KR | 10-2016-0147261 | 12/2016 |
| KR | 10-2016-0147894 | 12/2016 |
| WO | 2017/039051 | 3/2017 |

OTHER PUBLICATIONS

Extended Search Report dated Jan. 7, 2020 in counterpart European Patent Application No. EP19190768.2.
European Office Action dated Feb. 22, 2021 for EP Application No. 19190768.2.

* cited by examiner

ELECTRONIC DEVICE FOR PROVIDING NOTIFICATION MESSAGE AND METHOD THEREOF

CROSS-REFERENCE TO RELATED APPLICATION

This application is based on and claims priority under 35 U.S.C. § 119 to Korean Patent Application No. 10-2018-0092599, filed on Aug. 8, 2018, in the Korean Intellectual Property Office, the disclosure of which is incorporated by reference herein in its entirety.

BACKGROUND

Field

The disclosure relates to an electronic device for providing a notification message and a method thereof.

Description of Related Art

Owing to the development of a communication network such as the Internet and the miniaturization of an electronic device, a user can simultaneously use a plurality of portable electronic devices. For example, the user can simultaneously use a first electronic device such as a smartphone and a second electronic device such as a smartwatch. Whenever identifying a notification message from an application that is being executed in the communication network or the first electronic device, the first electronic device can transmit the identified notification message to the second electronic device. For example, when the first electronic device identifies a lot of notification messages within a group chatting room of a messenger application, the first electronic device can transmit each of the notification messages to the second electronic device.

Even when the notification message does not request a user for instant output, the first electronic device can instantly send the second electronic device the identified notification message. A time point at which the notification message is transmitted to the second electronic device can be independent from a state of a processor of the second electronic device. For example, in a sleep state of the processor of the second electronic device, the first electronic device can send the second electronic device the notification message not requesting the user for instant output. In this case, the processor of the second electronic device can be converted from the sleep state to an active state and thereafter, perform an operation related with reception of the notification message. While the processor of the second electronic device is converted from the sleep state to the active state, the processor of the second electronic device can consume power.

The above information is presented as background information only to assist with an understanding of the present disclosure. No determination has been made, and no assertion is made, as to whether any of the above might be applicable as prior art with regard to the present disclosure.

SUMMARY

According to various example embodiments of the disclosure an electronic device for providing a notification message capable of reducing power consumption and a method thereof are provided.

An electronic device according to various example embodiments may include a display, communication circuitry configured to perform wireless connection with an external electronic device, a processor operatively coupled with the display and the communication circuitry, and a memory operatively connected with the processor. The memory may store instructions which, when executed, configure the processor to control the electronic device to: receive information on a first notification message generated within the external electronic device using the communication circuitry, display the first notification message through the display, and receive one or more second notification messages generated within the external electronic device prior to the first notification message, and, display the second notification message in at least a portion of the display in response to an input.

An electronic device according to various example embodiments may include a display, input circuitry, sensor circuitry, communication circuitry configured to establish a wireless connection with an external electronic device, a processor operatively coupled with the display, the input circuitry, the sensor circuitry and the communication circuitry, and a memory operatively connected with the processor. The memory may store instructions which, when executed, cause the processor to: convert a sleep state of the processor into an active state based on a signal forwarded to the input circuitry and/or the sensor circuitry while the processor is in the sleep state, and control the electronic device to: request the external electronic device for a first notification message using the communication circuitry, receive information on the first notification message generated within the external electronic device using the communication circuitry, and display the first notification message in at least a portion of the display.

An electronic device according to various example embodiments may include a memory configured to store one or more applications, communication circuitry configured to establish a wireless connection with an external electronic device, and a processor operatively coupled with the memory and the communication circuitry. The memory may store instructions which, when executed, configure the processor to control the electronic device to: identify first information on a first notification message from at least one of the one or more applications, restrict transmitting the first notification message to the external electronic device in response to obtaining a designated value from the identified first information, identify second information on a second notification message from at least one of the one or more applications, and transmit the second notification message to the external electronic device in response to obtaining a value different from the designated value from the identified second information.

An electronic device according to various example embodiments may include a memory configured to store one or more applications, communication circuitry configured to establish a wireless connection with an external electronic device, and a processor operatively coupled with the memory and the communication circuitry. The memory may store instructions which, when executed, configure the processor to control the electronic device to: identify a state of the external electronic device in response to a notification message identified from at least one of the one or more applications, transmit the identified notification message to the external electronic device based on identifying the state of the external electronic device corresponding to an active state, and restrict transmitting the identified notification message to the external electronic device based on identifying of the state the external electronic device corresponding to an inactive state.

In an electronic device of various example embodiments and a method thereof, when a notification message does not request a user for instant output, the electronic device may restrict transmitting the notification message to an external electronic device. A time point at which the notification message is transmitted to the external electronic device may be associated with a state of the processor of the external electronic device. As the transmission of the notification message requesting the user for instant output is restricted, a frequency at which the processor of the external electronic device is converted from the sleep state to the active state is decreased, whereby the processor of the external electronic device can save power.

An effect obtainable from the disclosure is not limited to the above-mentioned effects, and other effects not mentioned will be apparent and understood from the following disclosure by a person having ordinary skill in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described with reference to the accompanying drawings.

Figure 1:
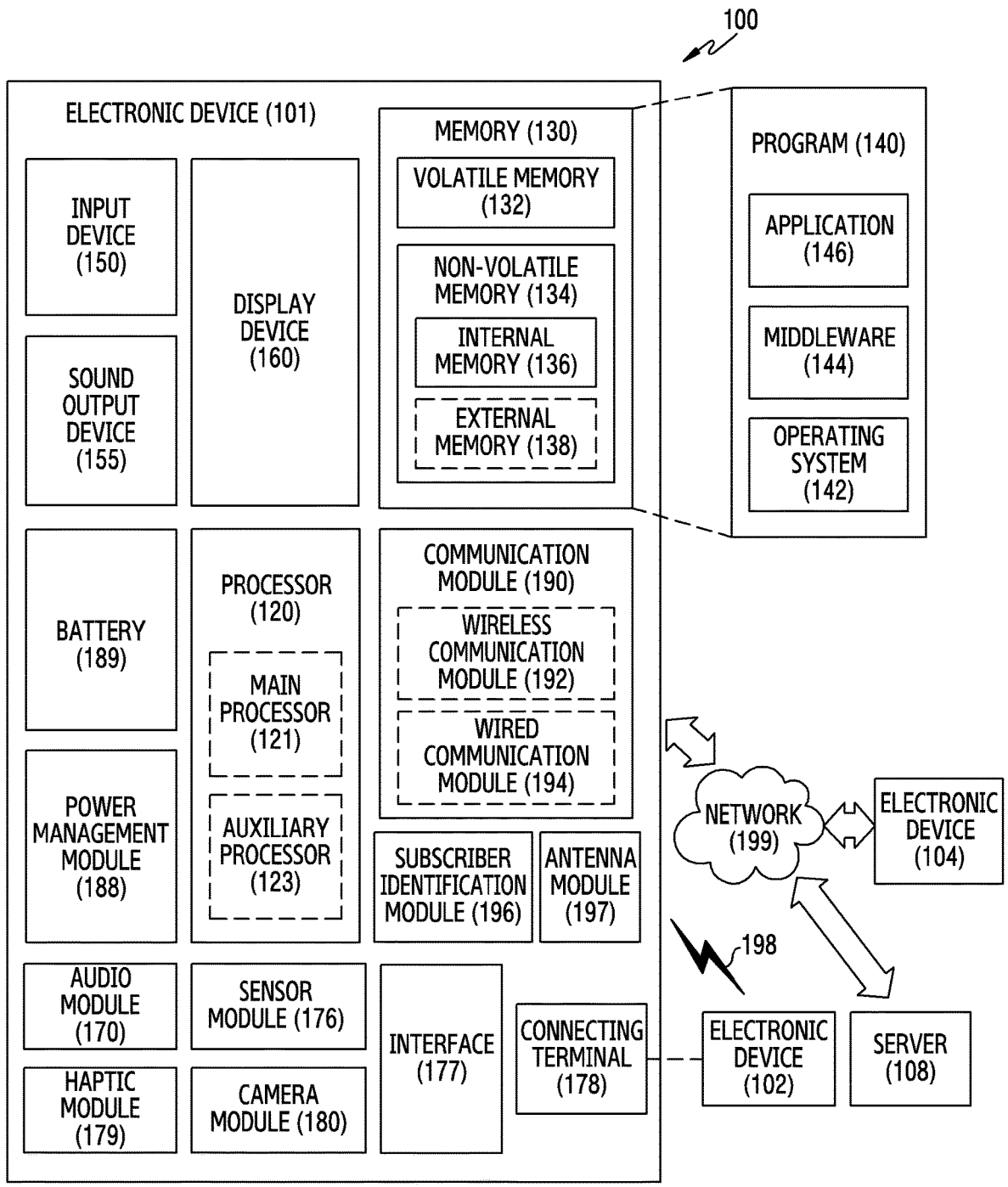
FIG. 1 is a block diagram illustrating an example electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The term "module" or the ending of a word, such as "or", "er", or the like may indicate a unit of processing at least one function or operation, and this may be embodied by hardware, software, or a combination of hardware and software. These terms are illustrated for convenience of illustration. Accordingly, the present disclosure is not limited to the following terms and other terms having the same technical meaning may be used.

Figure 2:
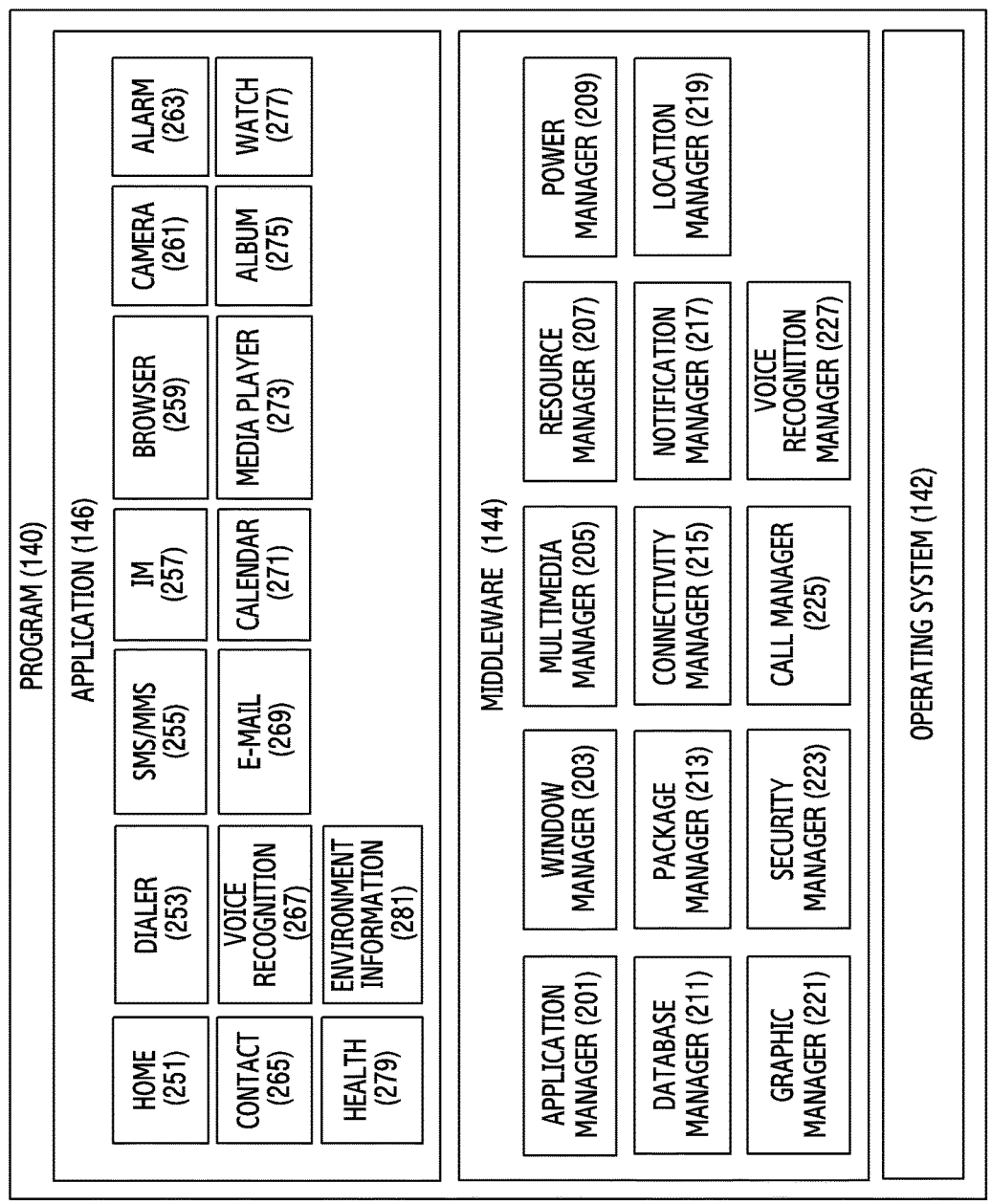
FIG. 2 is a block diagram illustrating an example program according to various embodiments.

FIG. 2 is a block diagram 200 illustrating an example program 140 according to various embodiments. According to an embodiment, the program 140 may include an operating system (OS) 142 to control one or more resources of the electronic device 101, middleware 144, and/or an application 146 executable in the operating system 142. The operating system 142 may include, for example, Android™, iOS™, Windows™, Symbian™, Tizen™, or Bada™. At least part of the program 140, for example, may be pre-loaded on the electronic device 101 during manufacture, or may be downloaded from or refined by an external electronic device (e.g., the electronic device 102 or 104, or the server 108) during use by a user.

The operating system 142 may control management (e.g., allocation or deallocation) of one or more system resources (e.g., process, memory, or power source) of the electronic device 101. Additionally or alternatively, the operating system 142 may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 wherein the application 146 may use a function or information provided from one or more resources of the electronic device 101. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony (e.g., call) manager 225, and/or a voice recognition manager 227.

The application manager 201 may, for example, manage a lifecycle of the application 146. The window manager 203, for example, may manage one or more graphical user interface (GUI) resources that are used on a screen. The multimedia manager 205, for example, may identify one or more formats necessary for playing media files, and may encode or decode a corresponding one of the media files by using a codec appropriate for a corresponding format selected from the one or more formats. The resource manager 207, for example, may manage a source code of the application 146 or a memory space of the memory 130. The power manager 209, for example, may manage the capacity, temperature, or power of the battery 189, and determine or provide related information necessary for the operation of the electronic device 101 by using corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or refining of an application that is distributed in the form of a package file. The connectivity manager 215, for example, may manage a wireless connection or a direct connection between the electronic device 101 and the external electronic device. The notification manager 217, for example, may provide a function to notify a user of the occurrence of a specified event (e.g., an incoming call, message, or alert). The location manager 219, for example, may manage locational information on the electronic device 101. The graphic manager 221, for example, may manage one or more graphic effects to be offered to a user, or a user interface related to the one or more graphic effects.

The security manager 223 may, for example, provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the operating system 142 or may be implemented as another software separate from the operating system 142.

The application 146 may, for example, include a home 251, a dialer 253, a short message service (SMS)/multimedia message service (MMS) 255, an instant message (IM) 257, a browser 259, a camera 261, an alarm 263, a contact 265, a voice dial or voice recognition 267, an electronic mail (e-mail) 269, a calendar 271, a media player 273, an album 275, a watch 277, a health application 279 (e.g., measuring biometric information such as momentum, blood sugar or the like), and/or an environment information 281 (e.g., air pressure, humidity, or temperature information measurement) application. According to an embodiment, the application 146 may further include an information exchanging application (not shown) that is capable of supporting information exchange between the electronic device 101 and an external electronic device. The information exchange application, for example, may include a notification relay application adapted to transfer designated information (e.g., a call, message, or alert) to the external electronic device, or a device management application adapted to manage the external electronic device. The notification relay application may transfer notification information corresponding to the occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., a brightness, resolution, or focus of the display device 160 or the camera module 180) of the external electronic device or some components thereof communicating with the electronic device 101. The device management application, additionally or alternatively, may support installation, deletion, or refining of an application running on the external electronic device.

Figure 3:
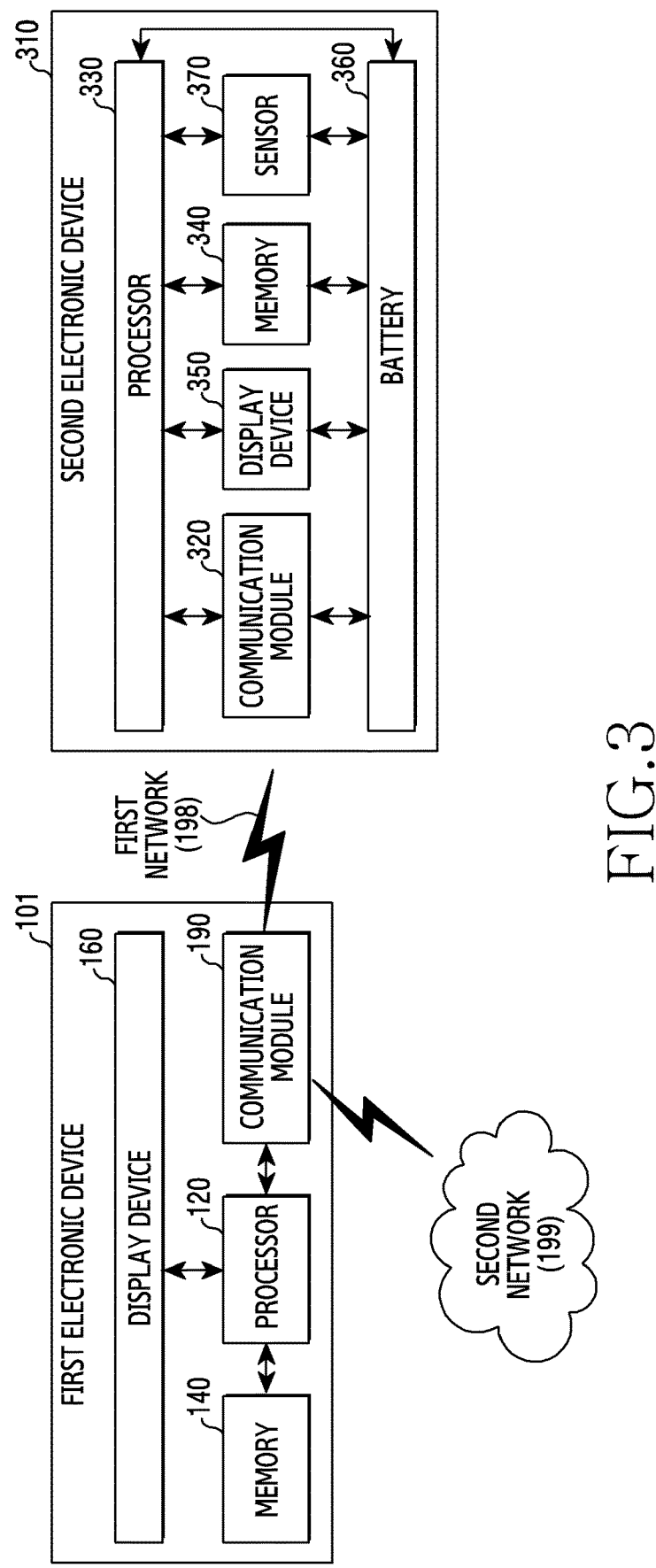
FIG. 3 is a block diagram illustrating an example first electronic device and an example second electronic device according to various embodiments.

FIG. 3 is a block diagram illustrating an example first electronic device 101 and an example second electronic device 310 according to various embodiments.

The first electronic device 101 may correspond, for example, and without limitation, to at least one of a smartphone, a smartpad, a tablet PC, a personal digital assistant (PDA), a laptop PC or a desktop PC, or the like. The first electronic device 101 may include the processor (e.g., including processing circuitry) 120, the memory 140, the communication module (e.g., including communication circuitry) 190 and/or the display device (e.g., including a display) 160. The first electronic device 101 may correspond to the electronic device 101 of FIG. 1. Each of the processor 120, the memory 140, the communication module 190 and the display device 160 may correspond to each of the processor 120, the memory 140, the communication module 190 and the display device 160 of FIG. 1.

The second electronic device 310 may correspond, for example, to a wearable device which may include, for example, and without limitation, at least one of an accessory type (e.g., a watch, a ring, a wristlet, an anklet, a necklace, glasses, a contact lens, or a head-mounted-device (HMD)), a fabric or clothing integrated type (e.g., electronic clothes), a human-body mount type (e.g., a skin pad or tattoo), a bio implantation type (e.g., an implantable circuit), or the like. The second electronic device 310 may include, for example, home appliances such as, for example, and without limitation, a refrigerator, a television (TV), a cleaner, an air conditioner, a washing machine, a lighting device, or the like. The second electronic device 310 may include a processor (e.g., including processing circuitry) 330, a memory 340, a communication module (e.g., including communication circuitry) 320, a display device (e.g., including a display) 350 and a battery 360.

The second electronic device 310 may further include a sensor 370 for measuring, for example, and without limitation, at least one of user's heart rate, blood pressure, body temperature, or the like. The sensor 370 may include, for example, and without limitation, at least one of a gyro sensor for measuring a posture or motion of the second electronic device 310, a gravity sensor, an acceleration sensor, or the like. The sensor 370 may include, for example, and without limitation, at least one of a microphone, acoustic sensor, illumination sensor, or the like, for measuring a peripheral environment of the second electronic device 310.

Each of the processors 120 and 330 may include various processing circuitry and execute one or more instructions stored in each of the memories 140 and 340. The processors 120 and 330 may include a circuit for processing data, for example, and without limitation, at least one of an integrated circuit (IC), an arithmetic logic unit (ALU), a field programmable gate array (FPGA), large scale integration (LSI), or the like. The memories 140 and 340 may each store data related with the first electronic device 101 and the second electronic device 310. The memories 140 and 340 may include a volatile memory such as a random access memory (RAM) including a static random access memory (SRAM) or a dynamic RAM (DRAM), etc., or include a nonvolatile memory such as not only a read only memory (ROM), a magnetoresistive RAM (MRAM), a spin-transfer torque MRAM (STT-MRAM), a phase-change RAM (PRAM), a resistive RAM (RRAM), and a ferroelectric RAM (FeRAM) but also a flash memory, an embedded multi media card (eMMC), a solid state drive (SSD), etc.

The memories 140 and 340 may store an instruction related to an application and an instruction related to an operating system (OS). The operating system is a system software executed by the processors 120 and 330. By executing the operating system, each of the processors 120 and 330 may manage hardware components included in each of the first electronic device 101 and the second electronic device 310. The operating system, an application being software other than the system software, may provide an application programming interface (API).

One or more applications, each of which is a set of a plurality of applications, may be installed within the memories 140 and 340. That the application is installed in the memories 140 and 340 may refer, for example, to the application being stored in the format of being executable by the processors 120 and 330 connected respectively to the memories 140 and 340.

Using, for example, and without limitation, at least one of an organic light emitting diode (OLED), a liquid crystal display (LCD), a light emitting diode (LED), or the like, the display devices 160 and 350 may visually output information to a user. The first electronic device 101 and/or the second electronic device 310 may include touch sensor panels (TSP) (not shown) arranged on the display devices 160 and 350, wherein the first electronic device 101 and/or the second electronic device 310 may more intuitively control a user interface (UI) output through the display devices 160 and 350. Using, for example, and without limitation, at least one of a resistive film, a capacitive component, a surface acoustic wave, infrared, or the like, the touch sensor panels may provide a location of an object (for example, a user's finger and/or a stylus) which touches the display devices 160 and 350 or hovers on the display devices 160 and 350.

The communication modules 190 and 320 may include various communication circuitry and connect the first electronic device 101 and/or the second electronic device 310 to at least one of a first network 198 and a second network 199, based on a wireless network such as, for example, and without limitation, Bluetooth, wireless fidelity (WiFi), near field communication (NFC), long term evolution (LTE), or the like, and a wired network such as, for example, and without limitation, a local area network (LAN), Ethernet, or the like. The communication modules 190 and 320 may include, for example, and without limitation, at least one of a communication circuitry, communication processor (CP), a communication interface supporting the wireless network or the wired network, or the like. The first electronic device 101 and the second electronic device 310 may be connected with each other through the first network 198 that is based on the communication modules 190 and 320.

In response to the processor 120 executing at least one application, the processor 120 may provide a notification message identified in the at least one application, to a user through the display device 160. In response to the processor 120 simultaneously executing a plurality of applications, the processor 120 may provide a notification message identified in each of the plurality of applications, to the user through the display device 160.

The processor 120 may identify one or more notification messages from the application installed in the memory 140, or the first network 198, or the second network 199. For example, the processor 120 may identify a notification message provided in the form of push notification, from a network service (for example, a messenger service) connected with the first electronic device 101 through the second network 199. The notification message may be processed based on a program (for example, the notification manager 217 of FIG. 2) executed by the processor 120.

The processor 120 may output a visual object corresponding to a notification message, within a UI generated based on an operating system (for example, a pop-up window such as a notification center, a home screen, a lock screen, and a toast). In response to a user performing a motion related with a visual object corresponding to a specific notification message (for example, a motion of touching or clicking the visual object), the processor 120 may output an application corresponding to a specific notification message or an application related with a network service, to the user.

The first electronic device 101 and the second electronic device 310 may be connected to each other through the first network 198 such as a short-range wireless communication network. In response to the first electronic device 101 and the second electronic device 310 being connected with each other, a notification message identified from an application that is being executed by any one of the processors 120 and 330 may be shared between the processors 120 and 330 by the communication modules 190 and 320. The second electronic device 310 may be an electronic device receiving a forward of a notification message of the first electronic device 101. For example, a notification message generated based on a first application that is being executed by the first electronic device 101 may be output simultaneously from all of the display device 160 of the first electronic device 101 and the display device 350 of the second electronic device 310. Even when the user uses only the second electronic device 310 not executing the first application, the user may identify a notification message related with the first application.

Referring to FIG. 3, hardware components, for example, the processor 330, the memory 340, the communication module 320 and the display device 350 of the second electronic device 310 may receive power from the battery 360. Though not illustrated, the first electronic device 101 may include a battery (not shown) for supplying power to the processor 120, the memory 140, the communication module 190 and the display device 160. Though not illustrated, the first electronic device 101 and the second electronic device 310 may include a circuit for managing power, for example, a power management integrated circuit (PMIC).

After the second electronic device 310 turns on, a state of the processor 330 of the second electronic device 310 may not be maintained as an active state consistently. The active state, a state after completion of the booting of the processor 330, may refer, for example, to a state of being capable of executing one or more instructions. The active state may refer, for example, to a state in which the processor 330 receives power equal to or greater than normal power, reference power or designated power (voltage or current) from the battery 360 through the PMIC. The active state may refer, for example, to a state of being capable of executing one or more instructions so as to receive a notification message from the first electronic device 110 through the communication module 320, or output a UI through a display, or receive a user's input through an input device (not shown).

According to various embodiments, after the booting is completed, the state of the processor 330 may be switched between the active state and the sleep state. The sleep state may refer, for example, to a state in which the processor 330 does not request a booting for conversion into the active state, but requests for obtaining normal power from the PMIC. In various embodiments, the sleep state may refer, for example, to a state of obtaining power lower than reference power from the PMIC of the second electronic device 310. In various embodiments, the sleep state may include, for example, and without limitation, one or more of an inactive state, an idle state, a standby state, a low power state, or the like.

In an embodiment, the processor 330 and the communication module 320 may be included in one IC. The sleep state may refer, for example, to a state in which, while the communication module 320 within the IC obtains normal power from the PMIC, the processor 330 obtains power less than the normal power from the PMIC.

In another embodiment, the processor 330 may include all of an application processor (AP) performing a function related with an application and a communication processor (CP) performing a function related with communication. The sleep state may refer, for example, to a state in which the AP included in the processor 330 obtains power less than normal power from the PMIC. A magnitude of power that the CP included in the processor 330 obtains from the PMIC while the AP included in the processor 330 obtains the power less than the normal power from the PMIC may be independent from a magnitude of the power that the AP obtains. For example, while the AP included in the processor 330 obtains the power less than the normal power from the PMIC, the CP included in the processor 330 may obtain the normal power from the PMIC.

That the state of the processor 330 is switched between the active state and the sleep state may be triggered by a wireless signal forwarded between the first electronic device 101 and the second electronic device 310. That the state of the processor 330 is switched between the active state and the sleep state may be triggered by a user's designated action. For example, in a situation in which the state of the processor 330 is the sleep state, in response to the user pressing a toggle button (for example, a power button) disposed in a housing of the second electronic device 310 or turning a dial, the state of the processor 330 may be converted from the sleep state to the active state. For example, the second electronic device 310 may include at least one of a gyro sensor for sensing a posture of the second electronic device 310 in a space, an acceleration sensor or a gravity sensor. Based on a signal generated from at least one of the gyro sensor, the acceleration sensor or the gravity sensor in response to a change of a posture of the second electronic device 310 by a user, the state of the processor 330 may be converted from the sleep state to the active state. For example, when the user moves the second electronic device 310 worn on the wrist to look to the face, the state of the processor 330 may be converted from the sleep state to the active state.

For example, in a situation in which the state of the processor 330 is the sleep state, in response to a notification message generated based on a first application that is being executed by the first electronic device 101 reaching the communication module 320 through the first network 198, the communication module 320 may input, to the processor 330, a signal (for example, an interrupt signal) of converting the state of the processor 330 from the sleep state to the active state. After being converted from the sleep state to the active state in response to the signal of the communication module 320, the processor 330 may process a notification message received through the communication module 320. That the processor 330 processes a notification message may refer, for example, to outputting the notification message to a user through various output means (for example, at least one of the display device 350, a speaker, a vibration motor and an LED).

The processor 120 of the first electronic device 101 may transmit, to the second electronic device 310, a notification message related with the first electronic device 101, for example, a notification message identified from one or more applications that is being executed by the processor 120 or from the second network 199. For example, the notification message generated from the one or more applications that are being executed by the processor 120 or from the second network 199 may be transmitted to the second electronic device 310 directly after being identified by the processor 120.

According to various embodiments, a time point at which a notification message of the first electronic device 101 is transmitted to the second electronic device 310 may be associated with at least one of a time point at which the notification message is identified by the processor 120, a time point at which a state of the processor 330 is an active state, and the instantaneity of the notification message. The instantaneity of the notification message may be indicated in information, a value or a parameter included in the notification message. For example, in response to the notification message not requiring the activation of an LED, the output of a UI through a display, the output of a designated voice signal, and an external output such as the activation of a vibration motor, the processor 120 may identify the notification message as a notification message not having instantaneity.

Whether the notification message requires the external output may be identified based on an application related with the notification message. For example, the external output of the notification message may be identified based on a user's input related with a type of an application and/or a notification message output form of the application. For example, a user may identify the output or non-output of the notification message by chatting room of a messenger application. For example, the user may set the notification or non-notification of a group chatting room related with three persons or more, to mute, thereby removing the external output of the notification message related with the group chatting room. Below, a notification message not requiring external output may be referred to, for example, as a mute notification message or a notification message adapted to mute.

According to various embodiments, in response to the state of the processor 330 being the sleep state, the processor 120 may conditionally restrict transmitting a notification message related with the first electronic device 101, to the second electronic device 310. For example, in response to the notification message being the mute notification message not requiring the external output, the processor 120 may not transmit the notification message to the second electronic device 310. One or more mute notification messages whose transmission is restricted may be transmitted to the second electronic device 310 after the state of the processor 330 is converted from the sleep state to the active state. For example, in response to the processor 120 transmitting a notification message requiring external output to the second electronic device 310, the processor 330 converts into the active state and invokes the external output, so the processor 120 may transmit one or more mute notification messages together with the notification message requiring the external output, to the second electronic device 310. After being converted from the sleep state to the active state, in consideration of conditionally restricting the transmission of the identified mute notification message in the sleep state, the processor 330 of the second electronic device 310 may request the first electronic device 101 for a synchronization of the notification message. For example, the processor 330 may request for the transmission of one or more mute notification messages whose transmission is restricted. Below, an operation in which the second electronic device 310 synchronizes the mute notification messages being pended within the first electronic device 101 is described in greater detail with reference to FIGS. 4, 5A, 5B, 6, 7A, 7B, 8 and FIG. 9.

According to various embodiments, in response to receiving a first notification message through the first network 199 after the state of the processor 330 is converted into the sleep state, the first electronic device 101 may transmit the received first notification message to the second electronic device 310. The first notification message may be a notification message adapted to mute. After transmitting the first notification message to the second electronic device 310, the first electronic device 101 may restrict sending a notification message to the second electronic device 310, from a second notification message adapted to mute. In response to a notification message firstly identified after the state of the processor 330 is converted into the sleep state among a mute notification message or a notification message adapted to mute, the first electronic device 101 may conditionally transmit the notification message to the second electronic device 310.

Figure 4:
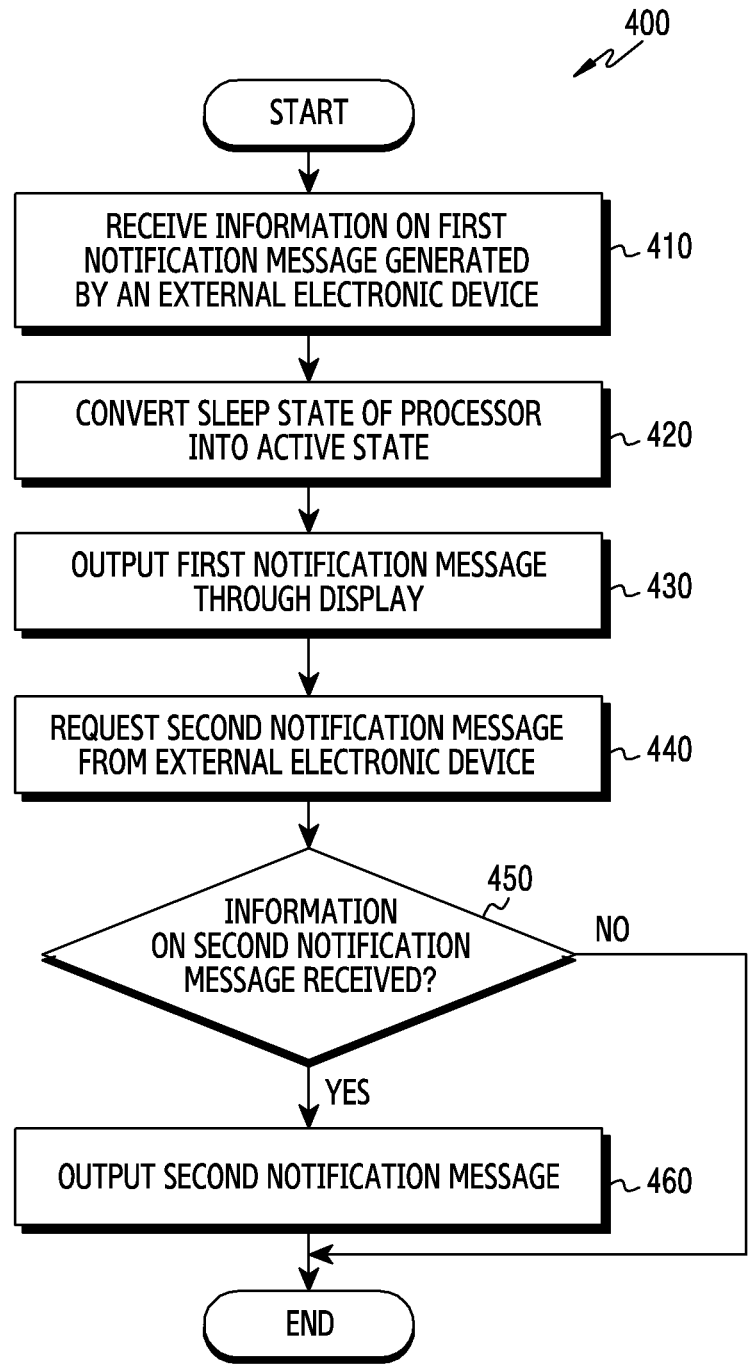
FIG. 4 is a flowchart illustrating an example operation in which an electronic device obtains notification messages stored in an external electronic device according to various embodiments.

FIG. 4 is a flowchart 400 illustrating an example operation in which an electronic device obtains notification messages stored in an external electronic device according to various embodiments. The electronic device of FIG. 4, for example, may correspond to the second electronic device 310 of FIG. 3. The external electronic device of FIG. 4 may, for example, correspond to the first electronic device 101 of FIG. 3. The operation of FIG. 4 may be performed by a processor (for example, the processor 330 of FIG. 3) of the electronic device.

Referring to FIG. 4, in operation 410, the electronic device of various embodiments may receive information on a first notification message generated by an external electronic device. The first notification message may be a message requiring external output, for example, at least one of the activation of an LED, the output of a UI through a display, the output of a designated voice signal, and the activation of a vibration motor. In response to identifying of the first notification message, the external electronic device may transmit the first notification message requiring the external output to the electronic device 310. A communication module (for example, the communication module 320 of FIG. 3) of the electronic device receiving the information on the first notification message may notify the reception of the information on the first notification message to the processor (for example, the processor 330 of FIG. 3) of the electronic device.

Referring to FIG. 4, in operation 420, in response to the reception of the information on the first notification message, the electronic device of various embodiments may convert a sleep state of the processor into an active state. For example, the communication module of the electronic device may forward an interrupt signal related with the reception of the information on the first notification message to the processor of the electronic device, to convert the sleep state of the processor into the active state. In response to the state of the processor being the active state at the time of receiving the information on the first notification message, operation 420 may be omitted. In response to the reception of the first notification message, the electronic device may perform operation 420 together with operation 410 or before operation 410.

In response to the reception of the first notification message requiring the external output, the processor may maintain the active state during a designated time (for example, 10 seconds). In response to the user not handling the electronic device within the designated time, the processor may convert the active state into the sleep state after the designated time. In response to the user handling the electronic device within the designated time, for example, in response to the user pressing a button of the electronic device or turning a dial or touching a display, the processor may maintain the active state even after the designated time.

In response to the conversion into the active state, in operation 430, the electronic device of various embodiments may output the first notification message through the display. The display may correspond to a display device (for example, the display device 350 of FIG. 3) included in the electronic device. For example, the electronic device may output a visual object corresponding to the first notification message within the display. The visual object corresponding to the first notification message may be generated based on (1) an operating system that is being executed by the processor of the electronic device or (2) an application related with the first notification message and installed in the electronic device. The form of the visual object corresponding to the first notification message may be subordinated to the information on the first notification message. According to various embodiments, the electronic device may output notifications (for example, the generation of a vibration, the flickering of an LED, and/or the output of a voice signal) of various forms related with the first notification message, based on the information on the first notification message.

Referring to FIG. 4, in operation 440, the electronic device of various embodiments may request one or more second notification messages which have been generated within an external electronic device prior to the first notification message. The one or more second notification messages may be notification messages not requiring external output, e.g., mute notification messages. The electronic device may request the external electronic device for transmission of the second notification message by using a communication circuitry.

According to various embodiments, the electronic device may conditionally request one or more second notification messages. For example, in response to identifying that the first notification message is the notification message requiring external output, the electronic device may request the external electronic device for transmission of the one or more second notification messages. For example, in response to receiving the mute notification message before reception of the information on the first notification message, the electronic device may request the external electronic device for the transmission of the one or more second notification messages.

Referring to FIG. 4, in operation 450, the electronic device of various embodiments may determine whether it receives information on the second notification message from the external electronic device. In response to the request of operation 440, the external electronic device may send the electronic device the one or more second notification messages that are pending on the external electronic device. In response to the external electronic device sending a plurality of second notification messages, the external electronic device may send the electronic device the plurality of second notification messages in sequence, according to time at which the plurality of second notification messages are generated.

In some embodiments, the electronic device may receive the information on the second notification message even without operation 440 related with the request for the second notification message. For example, the external electronic device may send one or more second notification messages generated prior to the first notification message, together with the first notification message. A sequence in which the external electronic device sends the electronic device the first notification message and the one or more second notification messages may be associated with a sequence in which the external electronic device identifies each of the first notification message and the one or more second notification messages.

In response to the reception of the information on the one or more second notification messages, in operation 460, the electronic device of various embodiments may output the received one or more second notification messages. The electronic device may output the one or more second notification messages, next to the first notification message output within the display, based on operation 430. The electronic device may output, within the display, in sequence starting from the latest generated notification message among the first notification message and the one or more second notification messages.

Figure 5A:
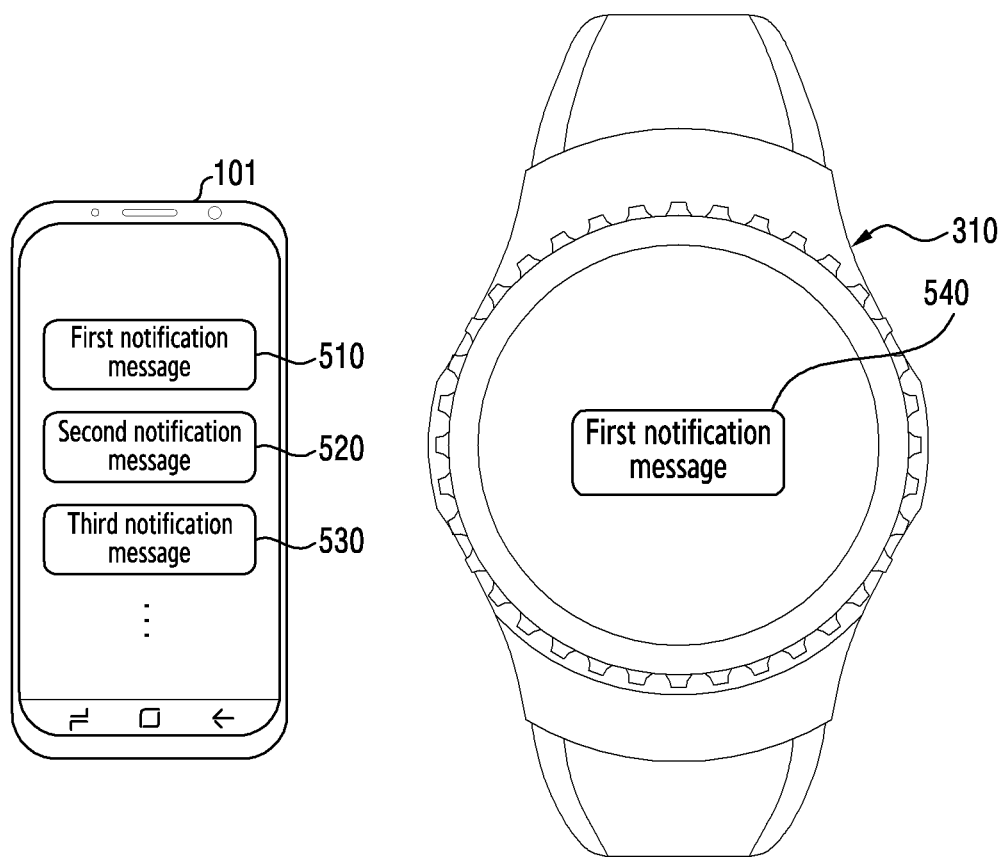
FIG. 5A is a diagram illustrating an example of a notification message output by a first electronic device and a second electronic device according to various embodiments.
Figure 5B:
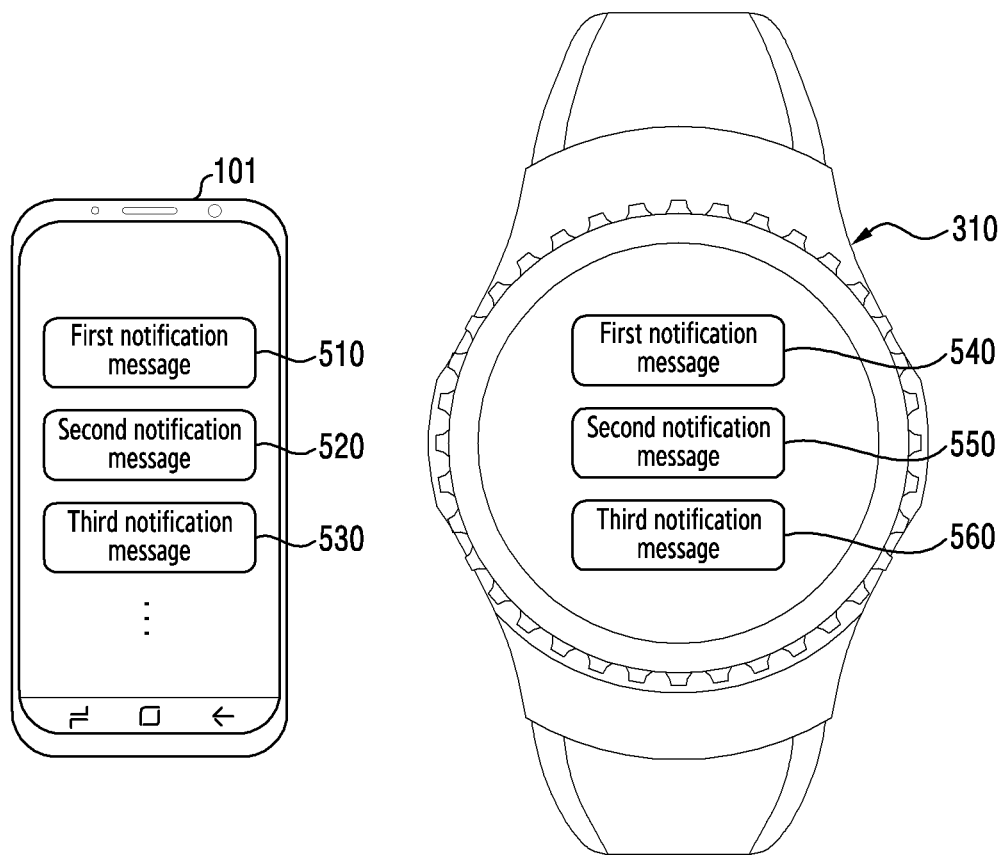
FIG. 5B is a diagram illustrating an example of a notification message output by a first electronic device and a second electronic device according to various embodiments.

FIG. 5A is a diagram illustrating an example notification message output by the first electronic device 101 and the second electronic device 310 according to various embodiments. FIG. 5B is a diagram illustrating an example notification message output by the first electronic device 101 and the second electronic device 310 according to various embodiments. Each of the first electronic device 101 and the second electronic device 310 of FIGS. 5A and 5B may correspond to each of the first electronic device 101 and the second electronic device 310 of FIG. 3. The second electronic device 310 of FIGS. 5A and 5B may correspond to the electronic device of FIG. 4, and the first electronic device 101 of FIGS. 5A and 5B may correspond to the external electronic device of FIG. 4.

The first electronic device 101 may identify one or more notification messages, from one or more applications that are being executed by a network or the first electronic device 101. Referring to FIG. 5A, the first electronic device 101 may output visual objects 510, 520 and 530 corresponding to a respective plurality of notification messages within a display of the first electronic device 101.

The visual objects 510, 520 and 530 corresponding to the respective plurality of notification messages may be disposed in sequence in which the plurality of notification messages are generated, within a designated UI (for example, a notification center and a lock screen). The notification center may be a UI output within the display in response to a user's designated motion (for example, a motion in which a user touches and swipes an upper end of the display toward a lower end of the display with the finger) carried out on a display of the activated first electronic device 101. The lock screen may be a UI output after wake-up of the first electronic device 101 by the user and requesting the user for information (for example, the fingerprint, a face, the iris, a voice, a password, and/or a pattern) for unlocking a locked state of the first electronic device 101.

A sequence in which the visual objects 510, 520 and 530 are output within the display may be set wherein the visual object corresponding to the latest generated notification message is firstly output. Referring to FIG. 5A, the visual object 510 corresponding to the latest generated first notification message among the visual objects 510, 520 and 530 may be output to the uppermost end of the display. The visual object 520 corresponding to a second notification message generated prior to the first notification message and generated after a third notification message may be output under the visual object 510.

According to various embodiments, the visual objects 510, 520 and 530 corresponding to the respective plurality of notification messages may be output within the display in the form of a stack. In response to identifying of a new notification message, the first electronic device 101 may output a visual object corresponding to the new notification message over visual objects corresponding to the existing notification messages, and may shift the visual objects corresponding to the existing notification messages to a lower end of the display. The first electronic device 101 may output a visual object corresponding to the latest identified notification message to the uppermost end of the display.

For example, in response to the third notification message being generated, the visual object 530 corresponding to the third notification message may be output to the uppermost end of the display. In response to the second notification message generated after the third notification message, the first electronic device 101 may output the visual object 520 corresponding to the second notification message to the uppermost end of the display. In response to the output of the visual object 520, a location of the visual object 530 may be shifted to a lower end of the display. In response to the first notification message generated after the second notification message, the first electronic device 101 may output the visual object 510 corresponding to the first notification message to the uppermost end of the display. In response to the output of the visual object 510, locations of the visual objects 520 and 530 may be shifted to the lower end of the display.

In response to the first notification message being a notification message requiring external output, and the second notification message, the third notification message and the like generated prior to the first notification message being mute notification messages, the first electronic device 101 may conditionally restrict the transmission of the second notification message and the third notification message. For example, in response to the processor of the second electronic device 310 connected with the first electronic device 101 being in the sleep state, the first electronic device 101 may restrict the transmission of the second notification message and the third notification message. In response to identifying of the first notification message set to generate at least one of a display indication information signal, a voice information signal and a vibration information signal, the first electronic device 101 may send the first notification message to the second electronic device 310, independently from whether the processor of the second electronic device 310 is in the sleep state.

In response to reception of information on the first notification message, the second electronic device 310 may perform at least one of operation 410 to operation 430 of FIG. 4. Referring to FIG. 5A, the second electronic device 310 may output a visual object 540 corresponding to the first notification message. According to various embodiments, in response to identifying a request for generation of a voice signal from the information on the first notification message, the second electronic device 310 may play back a voice signal related with the first notification message. In response to identifying a request for generation of a vibration information signal from the information on the first notification message, the second electronic device 310 may activate a vibration motor correspondingly to vibration information. A layout of a visual object 540 may be identified based on layout information included in the information on the first notification message or an application corresponding to the first notification message.

Based on operation 440 of FIG. 4, the second electronic device 310 may send the first electronic device 101 a signal requesting one or more mute notification messages generated prior to the first notification message. In response to the signal of requesting the one or more mute notification messages, the first electronic device 101 may transmit a second notification message to a third notification message to the second electronic device 310 in sequence. A sequence in which the second notification message to the third notification message are transmitted may be set wherein the latest generated notification message is firstly transmitted.

Referring to FIG. 5B, in response to reception of the second notification message to the third notification message, the second electronic device 310 may output visual objects 550 and 560 corresponding to the respective second notification message to third notification message. The second electronic device 310 may output one or more second notification messages next to the first notification message, wherein the first notification message requiring external output and being firstly transmitted has higher order of priority than the one or more mute notification messages. Referring to FIG. 5B, the visual objects 550 and 560 corresponding to the respective second notification message to third notification message may have lower order of priority than the visual object 540 corresponding to the first notification message, within the display of the second electronic device 310.

As described above, a sequence in which the visual objects 540, 550 and 560 corresponding to the respective first notification message to third notification message are output within the display of the second electronic device 310 may correspond to a sequence in which the second electronic device 310 receives the first notification message to the third notification message. While the second electronic device 310 receives one or more mute notification messages, the second electronic device 310 may output a visual object corresponding to the latest received mute notification message under the existing output visual object. Below, an operation in which the second electronic device 310 may conditionally send the first electronic device 101 a signal of requesting one or more mute notification messages generated prior to the first notification message based on operation 440 of FIG. 4 is described.

Figure 6:
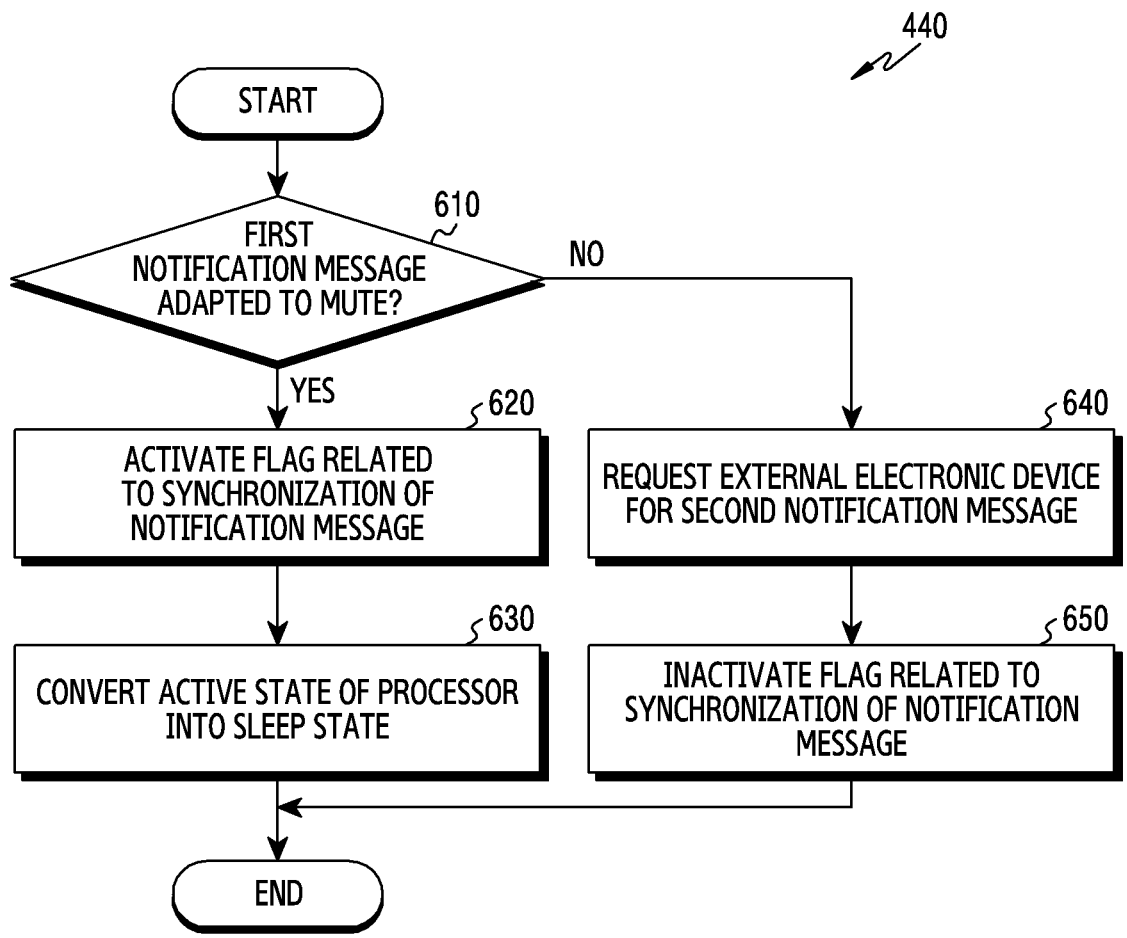
FIG. 6 is a flowchart illustrating an example operation that the electronic device of FIG. 4 performs corresponding to information included in a notification message according to various embodiments.

FIG. 6 is a flowchart 440 illustrating an example operation that the electronic device of FIG. 4 performs corresponding to information included in a notification message according to various embodiments. The electronic device of FIG. 6 may correspond to the second electronic device 310 of FIG. 3. An external electronic device of FIG. 6 may correspond to the first electronic device 101 of FIG. 3. The operation of FIG. 6 may be performed by a processor (for example, the processor 330 of FIG. 3) of the electronic device. At least one of operations of FIG. 6 may be related with operation 440 of FIG. 4.

Referring to FIG. 6, in operation 610, the electronic device of various embodiments may determine whether a first notification message received from the external electronic device has been adapted to mute. The electronic device may identify whether the first notification message requires external output, based on at least one of information, a flag and a parameter that are included in the first notification message. For example, in response to no one of a request for generation of a visual object to be displayed on at least part of the display, a request for generation of a voice information signal, and a request for generation of a vibration information signal being included in the first notification message, the electronic device may identify that the first notification message is a notification message adapted to mute. The electronic device of various embodiments may receive a notification signal of notifying that the first notification message received from the external electronic device is a message adapted to mute.

According to some embodiments, the electronic device may exchange each of its own information, in an operation of connecting with the external electronic device. For example, the electronic device may share designated information between the electronic device and the external electronic device. According to some embodiments, the electronic device may obtain types (for example, display indication information, speaker information, LED information, and/or vibration motor information) of external output which may be used by the notification message, from the external electronic device. In response to the first notification message including information related with the activation of at least one of the types, the electronic device may identify that the first notification message is a notification message requiring external output.

According to some embodiments, the electronic device may transmit the types (for example, display indication information, speaker information, LED information, and/or vibration motor information) of the external output which may be used in response to the notification message in the electronic device, to the external electronic device. The external electronic device may combine information related with activation of at least one of the types within the first notification message, to identify the external output corresponding to the first notification message. In this case, the electronic device may identify whether the first notification message has been adapted to mute based on information related with the first notification message.

In response to the first notification message being a notification message adapted to mute, in operation 620, the electronic device of various embodiments may activate a flag related with a synchronization of the notification message. For example, the electronic device may change a parameter or flag indicating the synchronization or non-synchronization of the notification message, into true. In a situation of receiving another notification message (for example, another notification message requiring external output) after the first notification message or a situation of converting a sleep state of the processor of the electronic device into an active state in response to an input by a user, the flag may be used for identifying whether to request the external electronic device for the synchronization of the notification message (described in greater detail below with reference to FIG. 8).

Referring to FIG. 6, in operation 630, the electronic device of various embodiments may convert the active state of the processor into the sleep state. Before converting the active state of the processor into the sleep state, for example, while activating the flag, the electronic device may perform at least an operation of notifying the reception of the first notification message. For example, the electronic device may turn on an LED, or output a designated icon related with the first notification message, to notify the user of the reception of the first notification message. In response to displaying of the first notification message by using at least part of the display or the LED, the electronic device may convert the active state of the processor into the sleep state.

Before converting the active state of the processor into the sleep state, the electronic device may transmit, to the external electronic device, a signal (for example, an Acknowledgement (Ack) signal) of identifying the reception of the first notification message. The electronic device may restrict transmitting, to the external electronic device, a signal of requesting a second notification message generated prior to the first notification message. For example, as the active state of the processor is converted into the sleep state, the electronic device may not transmit, to the external electronic device, a signal of requesting for a synchronization of the notification message.

Referring to operation 620 and operation 630 of FIG. 6, in response to reception of information on a first notification message (for example, a firstly generated notification message among a plurality of notification messages adapted to mute) set not to generate all of a display indication information signal, a voice information signal or a vibration information signal, the electronic device may restrict transmitting, to the external electronic device, a signal of requesting for one or more second notification messages generated prior to the currently received first notification message.

In response to the first notification message being a notification message not adapted to mute, in operation 640, the electronic device of various embodiments may request the external electronic device for transmission of the second notification message generated prior to the first notification message. The second notification message may be a notification message adapted to mute. In response to a flag related with a synchronization of a notification message being activated, the electronic device may request the external electronic device for transmission of the second notification message generated prior to the first notification message.

Referring to FIG. 6, in operation 650, the electronic device of various embodiments may inactivate the flag related with the synchronization of the notification message. The flag related with the synchronization of the notification message may be received after the first notification message, and be activated in response to another notification message adapted to mute. The flag related with the synchronization of the notification message may be inactivated in response to execution of the synchronization of the notification message between the electronic device and the external electronic device. For example, the electronic device may change a parameter or flag indicating the synchronization or non-synchronization of the notification message, to false.

Figure 7A:
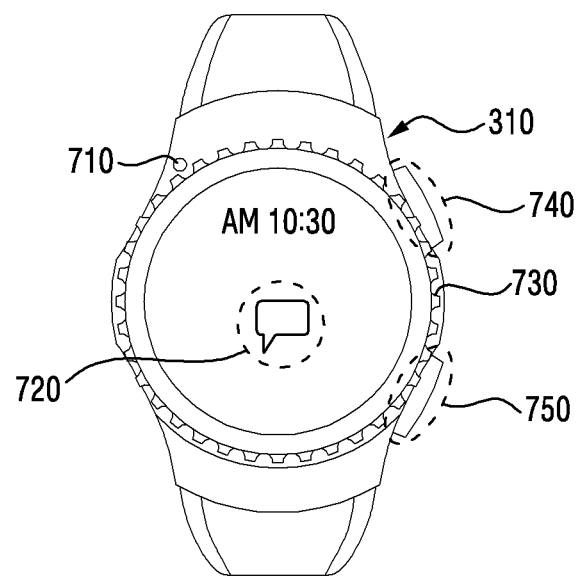
FIG. 7A is a diagram illustrating an example of a user interface that a second electronic device outputs in response to reception of a notification message according to various embodiments.
Figure 7B:
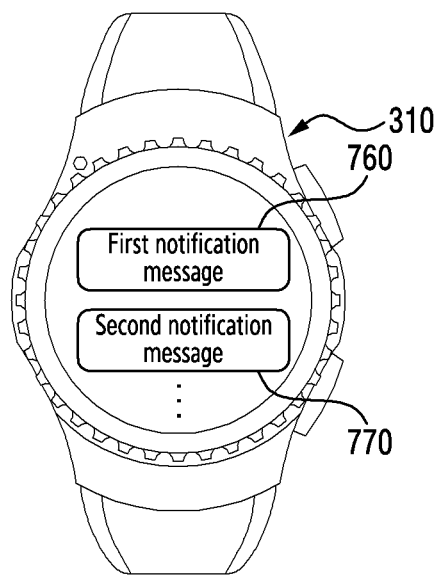
FIG. 7B is a diagram illustrating an example of a user interface that a second electronic device outputs in response to reception of a notification message according to various embodiments.

FIG. 7A is a diagram illustrating an example of a user interface that the second electronic device 310 outputs in response to reception of a notification message according to some embodiments. FIG. 7B is a diagram illustrating an example of a user interface that the second electronic device 310 outputs in response to reception of a notification message according to some embodiments. The second electronic device 310 of FIGS. 7A to 7B may correspond to the second electronic device 310 of FIG. 3. The second electronic device 310 of FIGS. 7A to 7B may correspond to the electronic device of FIG. 4 or FIG. 6.

According to some embodiments, a processor of the second electronic device 310 may generate frame data which includes content to be displayed while providing an always-on-display (AOD) mode. In some embodiments, the AOD mode may mean a mode of outputting the content through a display while the processor of the second electronic device 310 is in a sleep state. In some embodiments, the AOD mode may refer, for example, to a mode in which the processor of the second electronic device 310 is in the sleep state during at least part of a time duration of displaying the content through the display. In some embodiments, the AOD mode may refer, for example, to a mode of obtaining power from an internal power source of a display driving IC (DDI) of the second electronic device 310. In some embodiments, the AOD mode may be referred to as a self-display mode in an aspect of screen displaying dependent on an operation of the DDI itself.

In response to reception of a notification message adapted to mute, the processor of the second electronic device 310 may add a visual object 720 related with the notification message adapted to mute, within content to be displayed while providing the AOD mode. Referring to FIG. 7A, the visual object 720 may be an icon related with the notification message adapted to mute (for example, an icon of an application corresponding to the notification message). Although a state of the processor of the second electronic device 310 is, for example, converted from an active state to a sleep state based on operation 630 of FIG. 6, the visual object 720 may be continuously output within the display of the second electronic device 310.

According to some embodiments, in response to reception of the notification message adapted to mute, the second electronic device 310 may activate an LED 710 whose at least portion is exposed to the external through a housing. For example, the second electronic device 310 may activate the LED 710 based on at least one of a color, period and maintenance time corresponding to the notification message adapted to mute. The external electronic device (for example, the first electronic device 101 of FIG. 3) connected with the second electronic device 310 may transmit a firstly generated notification message among the notification message adapted to mute, to the second electronic device 310, and restrict transmission of a subsequent notification message.

Through the visual object 720 or the LED 710, a user may recognize the existence of the notification message adapted to mute. The user may perform an operation related with wake-up of the second electronic device 310, to convert a state of a processor of the second electronic device 310 from a sleep state to an active state. For example, the user may press at least one of buttons 740 and 750 disposed in the housing of the second electronic device 310, or turn a dial 730 disposed around the display of the second electronic device 310, thereby performing the operation related with the wake-up of the second electronic device 310.

In response to a user's input received after output of a notification message adapted to mute, the second electronic device 310 may transmit, to an external electronic device (for example, the first electronic device 101 of FIG. 3), a signal for requesting one or more notification messages whose transmission has been restricted. For example, in response to the user performing an operation related with wake-up after the output of the visual object 720 or the activation of the LED 710, the second electronic device 310 may transmit a signal related with a synchronization of the notification message, to the external electronic device.

Referring to FIG. 7B, the second electronic device 310 activated according to the operation related with the wake-up carried out by the user is illustrated. In response to a user's motion, the second electronic device 310 may transmit a signal related with a synchronization of a notification message to the external electronic device. In response to the signal, the external electronic device may transmit one or more notification messages whose transmission has been restricted. The second electronic device 310 may output the visual objects 760 and 770 corresponding to the respective one or more notification messages received from the external electronic device. A sequence in which the visual objects 760 and 770 are disposed in the display may be associated with time at which the notification messages corresponding to the respective visual objects 760 and 770 are generated.

Figure 8:
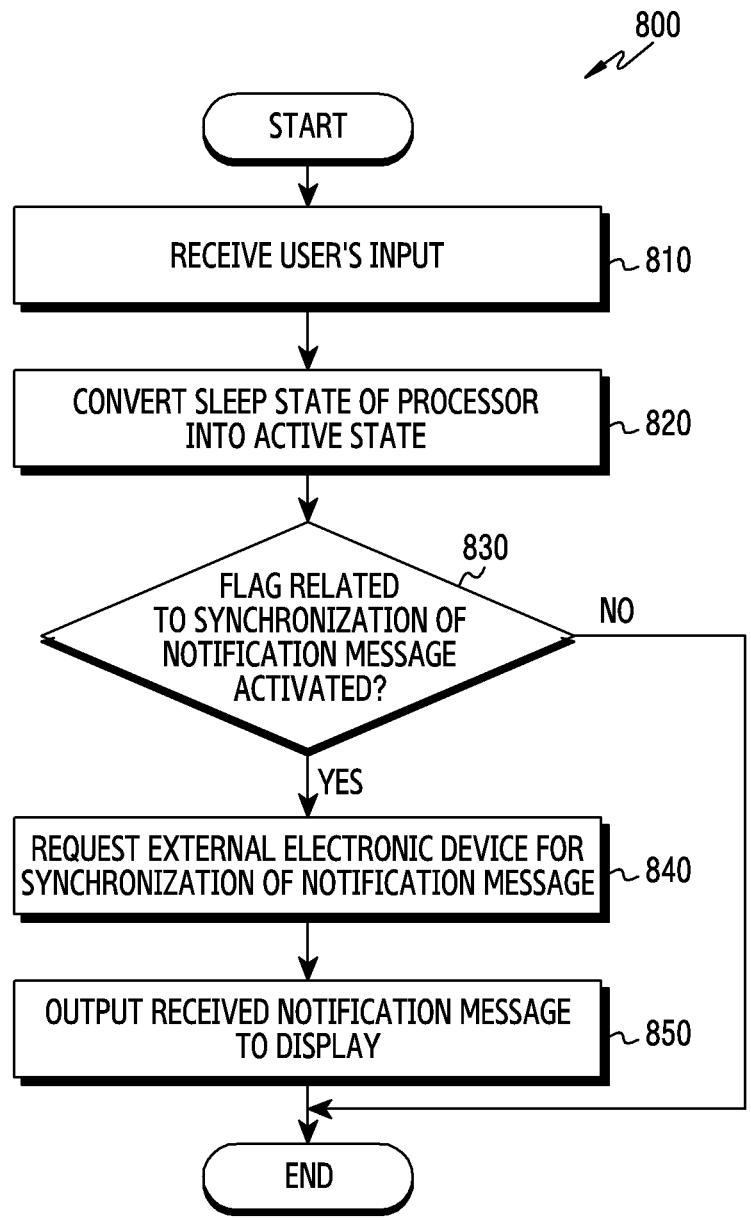
FIG. 8 is a flowchart illustrating an example operation in which an electronic device obtains notification messages stored in an external electronic device according to various embodiments.

FIG. 8 is a flowchart 800 illustrating another example operation in which an electronic device obtains notification messages stored in an external electronic device according to various embodiments. The electronic device of FIG. 8 may correspond to the second electronic device 310 of FIG. 3. The external electronic device of FIG. 8 may correspond to the first electronic device 101 of FIG. 3. The operation of FIG. 8 may be performed by a processor (for example, the processor 330 of FIG. 3) of the electronic device.

Referring to FIG. 8, in operation 810, the electronic device of various embodiments may receive a user's input related with wake-up. A state of the processor of the electronic device may be a sleep state. In the sleep state, the electronic device may output content related with an AOD mode (for example, a UI related with a current time and/or visual object corresponding to a notification message adapted to mute) within a display. For example, the user may turn the dial 730 of FIG. 7A, or press at least one of the buttons 740 and 750, thereby performing an operation related with wake-up of the electronic device.

In response to reception of the user's input, in operation 820, the electronic device of various embodiments may convert the sleep state of the processor into the active state. The electronic device may output a UI related with a notification message within the display. Within the UI, visual objects corresponding to a respective plurality of notification messages stored in the electronic device may be disposed in sequence starting from a visual object corresponding to the latest generated notification message.

Referring to FIG. 8, in operation 830, the electronic device of various embodiments may identify (e.g., determine) whether a flag related with a synchronization of a notification message has been activated. For example, the flag may be activated by reception of a notification message adapted to mute, based on FIG. 6. In response to the flag related with the synchronization of the notification message having been inactivated, the electronic device may not request the external electronic device for the synchronization of the notification message. For example, in response to a parameter or flag indicating the synchronization or non-synchronization of the notification message being false, the electronic device may not request the external electronic device for the synchronization of the notification message.

In response to the flag related with the synchronization of the notification message being activated, in operation 840, the electronic device of various embodiments may request the external electronic device for the synchronization of the notification message. For example, in response to the parameter or flag indicating the synchronization or non-synchronization of the notification message being true, the electronic device may request the external electronic device for the synchronization of the notification message. For example, the electronic device may request the external electronic device for transmission of one or more mute notification messages generated after a mute notification message related with activation of the flag. The external electronic device may transmit the one or more mute notification messages, to the electronic device, in sequence of generation.

Referring to FIG. 8, in operation 850, the electronic device of various embodiments may display the one or more notification messages received from the external electronic device in at least part of the display of the electronic device. The electronic device may dispose a plurality of notification messages, within the display, in sequence starting from the latest generated notification message.

Figure 9:
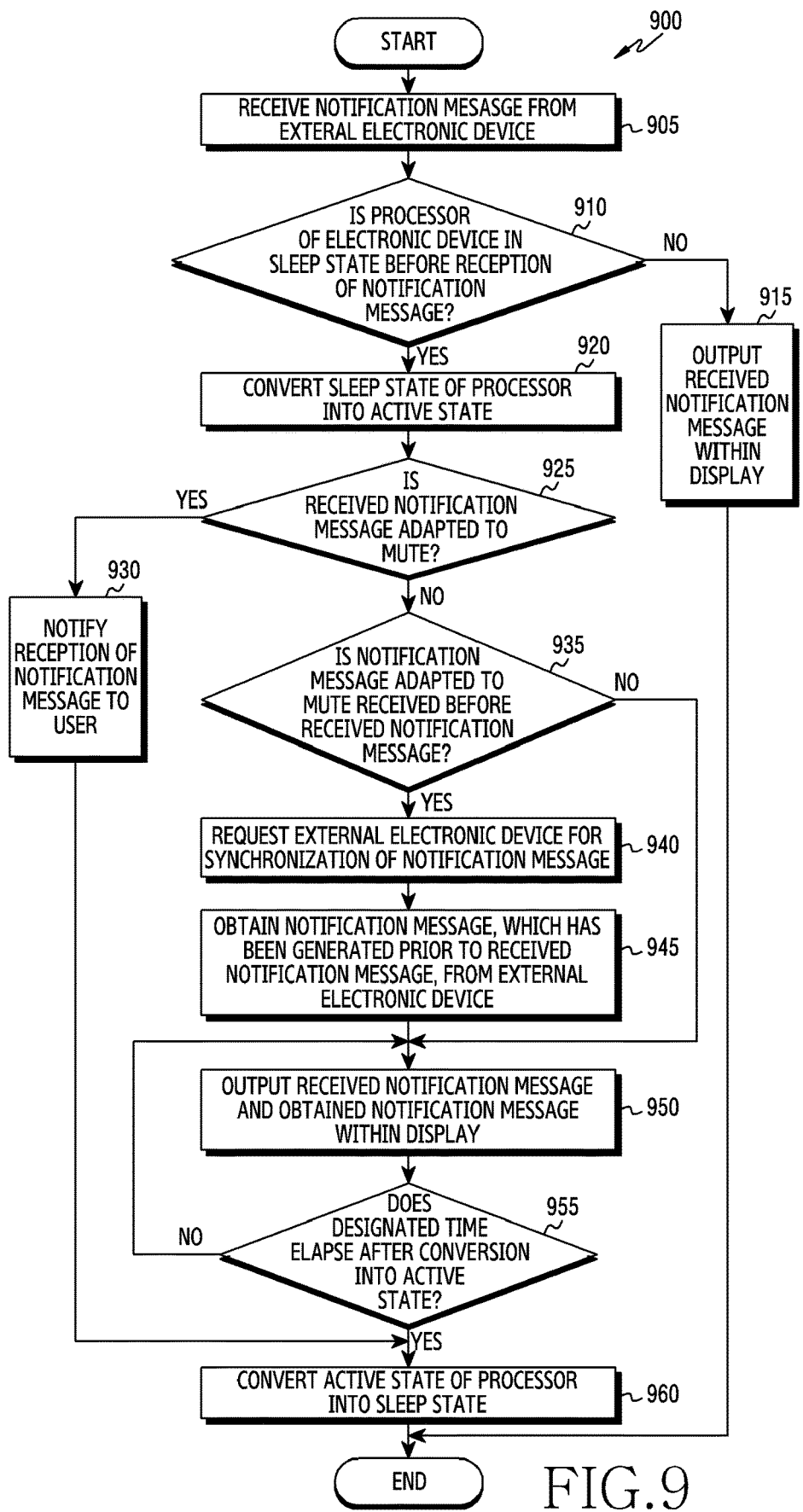
FIG. 9 is a flowchart illustrating an example operation of an electronic device according to various embodiments.

FIG. 9 is a flowchart 900 illustrating an example operation of an electronic device according to various embodiments. The electronic device of FIG. 9 may correspond to the second electronic device 310 of FIG. 3. The external electronic device of FIG. 9 may correspond to the first electronic device 101 of FIG. 3. The operation of FIG. 9 may be performed by a processor (for example, the processor 330 of FIG. 3) of the electronic device.

Referring to FIG. 9, in operation 905, the electronic device of various embodiments may receive a notification message from the external electronic device. The notification message may include information related with external output. The notification message may include information indicating the type (for example, a visual object displayed in at least portion of a display, the activation of an LED, the output of a voice signal, and/or the output of a vibration signal) of external output set by a user or the external electronic device. The notification message may include information indicating that no external output is generated. In response to reception of the notification message, the electronic device may convert a state of the processor into an active state.

Referring to FIG. 9, in operation 910, the electronic device of various embodiments may identify (e.g., determine) whether the state of the processor is a sleep state before the reception of the notification message of operation 905. An operation of the electronic device related with the reception of the notification message may be varied according to the state of the processor. A communication module (for example, the communication module 320 of FIG. 3) of the electronic device receiving the notification message may transmit a signal related with the reception of the notification message to the processor.

In response to the state of the processor not being the sleep state before the reception of the notification message, for example, in response to receiving the notification message after the state of the processor is an active state, in operation 915, the electronic device of various embodiments may output the received notification message within the display. For example, the electronic device may output a visual object related with the received notification message in at least portion of the display. In response to the notification message including information related with output of a voice signal or a vibration signal, the electronic device may output the voice signal or activate a vibration motor based on information included in the notification message. Referring to operations 905, 910 and 915, in response to the state of the processor being the active state, the electronic device may output the notification message received from the external electronic device, to the user, independently from whether the notification message has been adapted to mute.

In response to the state of the processor being the sleep state before the reception of the notification message, for example, in response to the state of the processor being converted from the sleep state to the active state in response to the reception of the notification message, in operation 920, the electronic device of various embodiments may convert the sleep state of the processor to the active state. For example, in response to a signal related with reception of the notification message generated in the communication module of the electronic device, the state of the processor may be converted from the sleep state to the active state. In response to converting the state of the processor into the active state, the processor may initiate a timer expiring after a designated time (for example, 10 seconds). In response to a notification message not adapted to mute, the processor may initiate the timer.

After converting the sleep state of the processor into the active state, in operation 925, the electronic device of various embodiments may identify (determine) whether the received notification message is a notification message adapted to mute. For example, in response to the notification message including at least one of information for outputting a visual object to the display, information for activation of an LED, information for output of a voice signal, and information for output of a vibration signal, the electronic device may identify that the received notification message is a notification message not adapted to mute. In response to the notification message including no information related with external output, the electronic device may identify that the received notification message is a notification message adapted to mute.

In response to the received notification message being the notification message adapted to mute, in operation 930, the electronic device of various embodiments may notify the reception of the notification message to a user. For example, the electronic device may notify the user of the reception of the notification message, by using the LED 710 or visual object 720 of FIG. 7A. Referring to FIG. 9, after notifying the user of the reception of the notification message, in operation 960, the electronic device of various embodiments may convert the active state of the processor into the sleep state. Operations 930 and 960 of FIG. 9 may correspond to operations 620 and 630 of FIG. 6.

In some embodiments, converting the active state of the processor into the sleep state in response to the received notification message being the notification message adapted to mute may be performed before the expiration of a timer of operation 920. Referring to operations 920, 925 and 930, the electronic device receiving the notification message adapted to mute during the sleep state may convert into the active state, to notify the user of the reception of the notification message, and thereafter may convert into the sleep state without performing an operation related with a synchronization of the notification message.

In response to the received notification message not being the notification message adapted to mute, in operation 935, the electronic device of various embodiments may identify whether it has received a notification message adapted to mute before the reception of the notification message of operation 905. For example, the electronic device may identify the notification message that is adapted to mute before operation 905, based on the flag that is activated according to operations 610 and 620 of FIG. 6. For example, the electronic device may perform operation 925 based on operation 830 of FIG. 8.

In response to receiving the notification message that is adapted to mute before the reception of the notification message of operation 905, in operation 940, the electronic device of various embodiments may request the external electronic device for a synchronization of the notification message. Operation 940 may correspond to operation 440. In response to receiving at least one mute notification message prior to the notification message that is received in operation 905, the electronic device may request the external electronic device for the synchronization of the notification message based on operation 940.

In some embodiments, the external electronic device may send, together with a first notification message not adapted to mute, at least one second notification message which is generated prior to the first notification message and is adapted to mute. In this case, operation 940 may be omitted. In some embodiments, the electronic device may not perform operation 940, in consideration of the at least one second notification message received together with the first notification message.

Referring to operations 935 and 940, in response to identifying of another notification message which is received prior to the notification message of operation 905 and which is set not to generate all of information displayed in at least a portion of the display, a voice information signal and a vibration information signal, the electronic device may transmit, to the external electronic device, a signal of requesting one or more notification messages which are generated between the notification message of operation 905 and the another notification message.

Referring to FIG. 9, in operation 945, the electronic device of various embodiments may obtain, from the external electronic device, one or more notification messages which have been generated prior to the notification message received in operation 905. The one or more notification messages obtained based on operation 945 may be notification messages adapted to mute. In response to the request for the synchronization of the notification message, the external electronic device may send the electronic device the one or more mute notification messages generated prior to the notification message of operation 905. An operation in which the external electronic device sends the one or more mute notification messages is described later.

Referring to FIG. 9, in operation 950, the electronic device of various embodiments may output the notification message received in operation 905 and the one or more notification messages obtained in operation 945, within the display of the electronic device. Within the display, the notification message received in operation 905 may have higher order of priority than the one or more notification messages obtained in operation 945. In response to not receiving the notification message adapted to mute before the reception of the notification message of operation 905 in operation 935, the electronic device may output only the notification message received in operation 905 within the display of the electronic device, without performing operations 940 and 945.

Referring to FIG. 9, in operation 955, the electronic device of various embodiments may identify (e.g., determine) whether a designated time has elapsed after the conversion of the state of the processor of operation 920 into the active state. As described above, in response to the processor initiating the timer, the electronic device may provide the completion of the timer. In response to a user performing an input related with the electronic device before the lapse of the designated time, the electronic device may hold the active state of the processor even after the designated time.

In response to the designated time elapsing or the timer being completed, in operation 960, the electronic device of various embodiments may convert the active state of the processor into the sleep state. For example, in response to failing to receive the input related with the electronic device from the user before the lapse of the designated time, the processor may be switched from the active state to the sleep state. As the active state of the processor is converted into the sleep state, a UI (for example, the UI shown in FIG. 7A) corresponding to the AOD mode may be output within the display of the electronic device.

A time point at which the electronic device of various embodiments receives a notification message may be concentrated on within a time duration in which the processor of the external electronic device is in the active state. The external electronic device may adjust a time point of transmitting the notification message in consideration of the sleep state of the electronic device. Below, an operation in which the external electronic device conditionally restricts the transmission of the notification message in consideration of the sleep state of the electronic device is described in more detail with reference to FIGS. 10, 11, 12, 13A, 13B, 14, 15A, 15B and FIG. 16.

Figure 10:
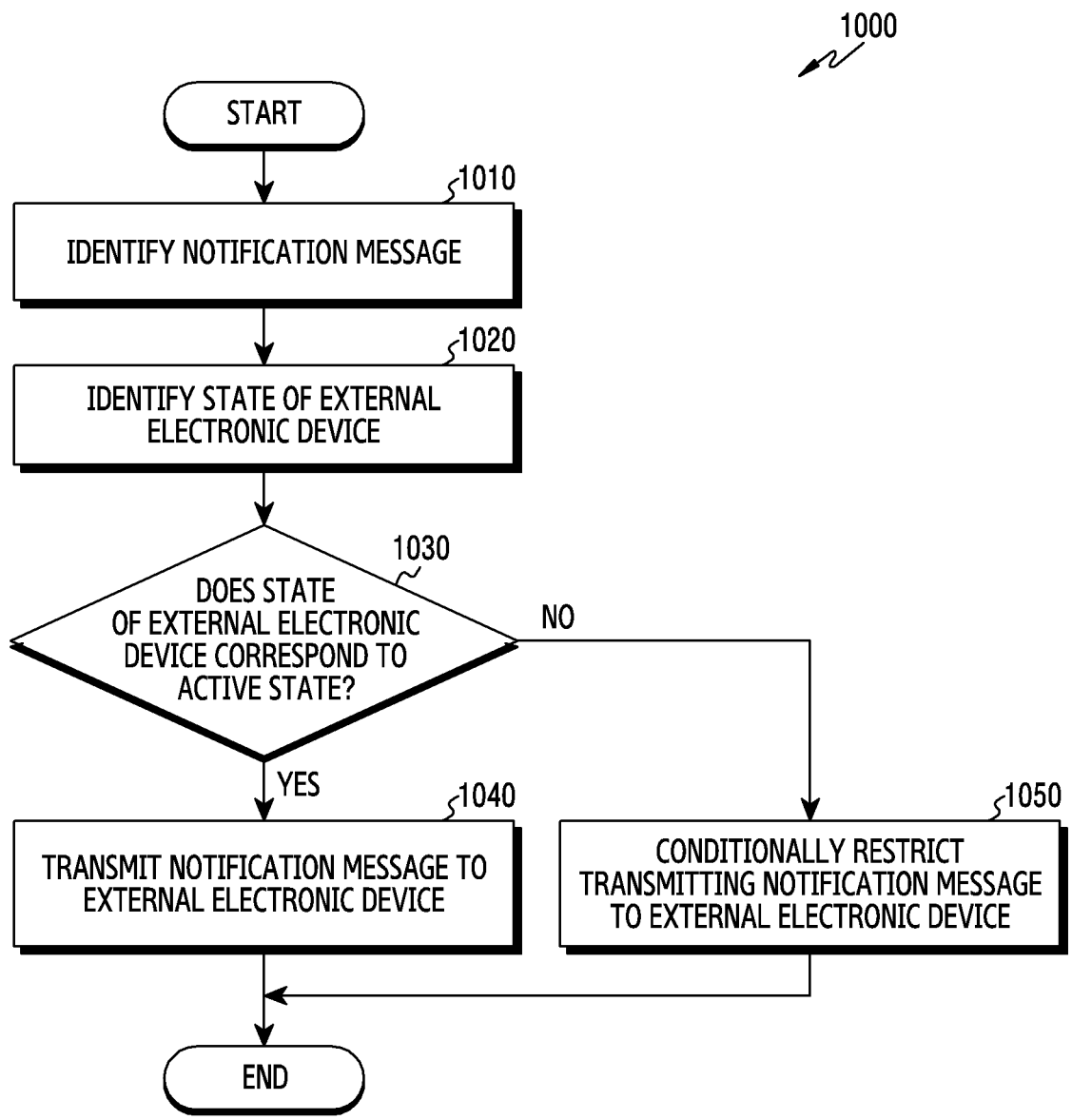
FIG. 10 is a flowchart illustrating an example operation in which an electronic device sends a notification message based on a state of an external electronic device according to various embodiments.

FIG. 10 is a flowchart 1000 illustrating an example operation in which an electronic device sends a notification message based on a state of an external electronic device according to various embodiments. The electronic device of FIG. 10 may correspond to the first electronic device 101 of FIG. 3. The external electronic device of FIG. 10 may correspond to the second electronic device 310 of FIG. 3. The operation of FIG. 10 may be performed by the first electronic device 101 of FIG. 3 or the processor 120 of FIG. 3.

Referring to FIG. 10, in operation 1010, the electronic device of various embodiments may identify a notification message. For example, the notification message may be generated based on one or more applications that are being executed by the electronic device. For example, the notification message may be provided in the form of a push notification from a network service connected with the electronic device.

Referring to FIG. 10, in operation 1020, in response to the identified notification message, the electronic device of various embodiments may identify a state of the external electronic device connected with the electronic device. The electronic device may identify a state of a processor of the external electronic device. The electronic device may identify the state of the processor of the external electronic device based on a signal transmitted to or received from the external electronic device. For example, in response to the electronic device having transmitted another notification message requiring external output, prior to the notification message identified in operation 1010, and a designated time (for example, 10 seconds) having not elapsed after the transmission of the another notification message, the electronic device may identify that the state of the processor of the external electronic device is the active state.

Referring to FIG. 10, in operation 1030, the electronic device of various embodiments may identify (e.g., determine) that the state of the external electronic device corresponds to the active state. In response to identifying of the state of the external electronic device corresponding to the active state, in operation 1040, the electronic device of various embodiments may send the external electronic device the notification message identified in operation 1010. Referring to operations 1030 and 1040, while the state of the external electronic device is the active state, the electronic device may, directly after identifying the notification message, send the identified notification message to the external electronic device.

In response to identifying of the state of the external electronic device not corresponding to the active state, for example, in response to identifying of the state of the external electronic device corresponding to an inactive state, in operation 1050, the electronic device of various embodiments may conditionally restrict transmitting the notification message identified in operation 1010 to the external electronic device. For example, in response to the notification message identified in operation 1010 being adapted to mute, and a mute notification message being sent to the external electronic device before the notification message identified in operation 1010, the electronic device may not send the external electronic device the notification message identified in operation 1010. For example, in response to the notification message identified in operation 1010 being a notification message requiring external output, the electronic device may send the external electronic device the notification message identified in operation 1010. A detailed operation that the electronic device performs in relation with operation 1050 is described in more detail with reference to FIG. 12.

Figure 11:
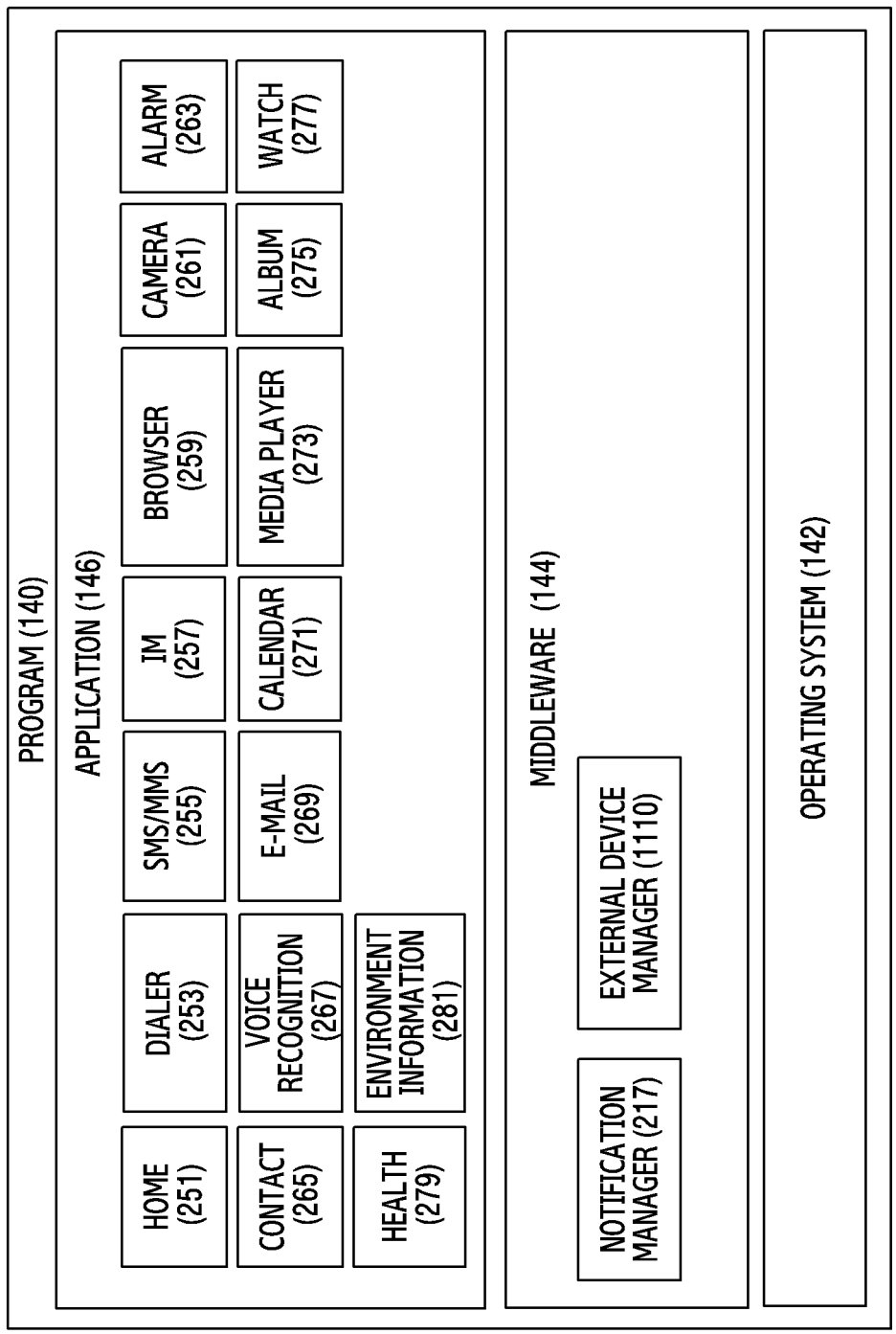
FIG. 11 is a block diagram illustrating an example program of an electronic device according to various embodiments.

FIG. 11 is a block diagram 200 illustrating an example program 140 of an electronic device according to various embodiments. The electronic device of FIG. 11 may correspond to the electronic device of FIG. 10. The program 140 of FIG. 11 may be stored in, for example, the memory 140 of the first electronic device 101 of FIG. 3.

Referring to FIG. 11, the program 140 may include an external device manager 1110 for supporting connection between an external electronic device (for example, the second electronic device 310 of FIG. 3) connected with the electronic device and the electronic device. The external device manager 1110 may correspond to at least a portion of the middleware 144. In response to a user wearing the external electronic device such as a smartwatch and then, connecting the electronic device and the external electronic device by using a watch 277 application, the electronic device may execute the external device manager 1110 as a background process.

The electronic device may identify a state of a processor of the external electronic device based on the external device manager 1110. The electronic device may directly receive the state of the processor of the external electronic device, from the external electronic device. The electronic device may estimate the state of the processor of the external electronic device, based on an event between the external electronic device and the electronic device. In response to the electronic device estimating the state of the processor of the external electronic device, the electronic device may store a result of estimating the state of the processor of the external electronic device, within a designated parameter managed by the external device manager 1110.

For example, the electronic device may identify the state of the processor of the external electronic device as any one of an active state or a sleep state, based on a signal transmitted and/or received between the external electronic device and the electronic device. For example, in response to the state of the processor of the external electronic device being converted from the active state to the sleep state, the external electronic device may send the electronic device a signal of notifying the conversion into the sleep state. In response to the reception of the signal, the electronic device may change a parameter corresponding to the state of the external electronic device managed by the external device manager 1110, into a value corresponding to the sleep state.

For example, the electronic device may send the external electronic device a signal (for example, a wake-up signal) of changing the state of the processor of the external electronic device from the sleep state to the active state. In response to the sending of the signal, the electronic device may change a parameter corresponding to the state of the external electronic device managed by the external device manager 1110, into a value corresponding to the active state. The electronic device may identify that the state of the processor of the external electronic device is maintained as the active state during a designated time after a designated event (for example, sending of a notification message requiring external output) related with the external electronic device, based on a timer having the designated time managed by the external device manager 1110.

The electronic device may transmit, to the notification manager 217, a notification message generated based on the application 146 installed in the electronic device. The electronic device may provide a plurality of notification messages to a user in sequence (for example, starting from the latest generated notification message), based on the notification manager 217. In response to the electronic device and the external electronic device being connected, the electronic device may communicate with the external electronic device based on the external device manager 1110. The electronic device may send a notification message of the notification manager 217 to the external device manager 1110. The notification message stored in the external device manager 1110 may be sent to the external electronic device, based on determination on whether the state of the processor of the external electronic device is the sleep state based on a parameter corresponding to the state of the external electronic device managed by the external device manager 1110.

For example, in response to the parameter of the external device manager 1110 corresponding to a value indicating the active state, the electronic device may transmit a notification message sent from the notification manager 217 to the external device manager 1110, to the external electronic device. In some embodiments, in response to the external electronic device being in the active state, the notification message identified in the electronic device may be sent to the external electronic device without substantial delay. In some embodiments, the electronic device may send a notification message to the external electronic device wherein the notification message is simultaneously output in each of a display of the electronic device and a display of the external electronic device.

For example, in response to the parameter of the external device manager 1110 corresponding to a value indicating the sleep state, the electronic device may restrict transmitting a notification message sent from the notification manager 217 to the external device manager 1110, to the external electronic device. In some embodiments, in response to the external electronic device being in the sleep state, all notification messages except (1) a notification message requiring external output (for example, a notification message not adapted to mute) and (2) a mute notification message firstly identified after the state of the processor of the external electronic device is converted into the sleep state may, without being transmitted to the external electronic device, be pended in the external device manager 1110.

The external device manager 1110 may include a database of storing a notification message not instantly transmitted to the external electronic device. Within the database, one or more notification messages may be stored in the form of a stack. For example, the electronic device may store a notification message within the database wherein the latest generated notification message has higher order of priority within the database of the external device manager 1110. The stack of the notification message may be generated by identifier of the notification message. The identifier (ID) of the notification message may correspond to an identifier of an application or an identifier used to distinguish the notification message within the application. For example, an identifier of a notification message generated in the watch 277 application may correspond to an identifier of the watch 277 application. For example, an identifier of a notification message generated in the SMS/MMS 255 application may include at least one of an identifier of the SMS/MMS 255 application and an identifier of a chatting room related with the notification message.

Below, an operation in which the electronic device stores a notification message within the electronic device without instantly transmitting the notification message is described in greater detail.

Figure 12:
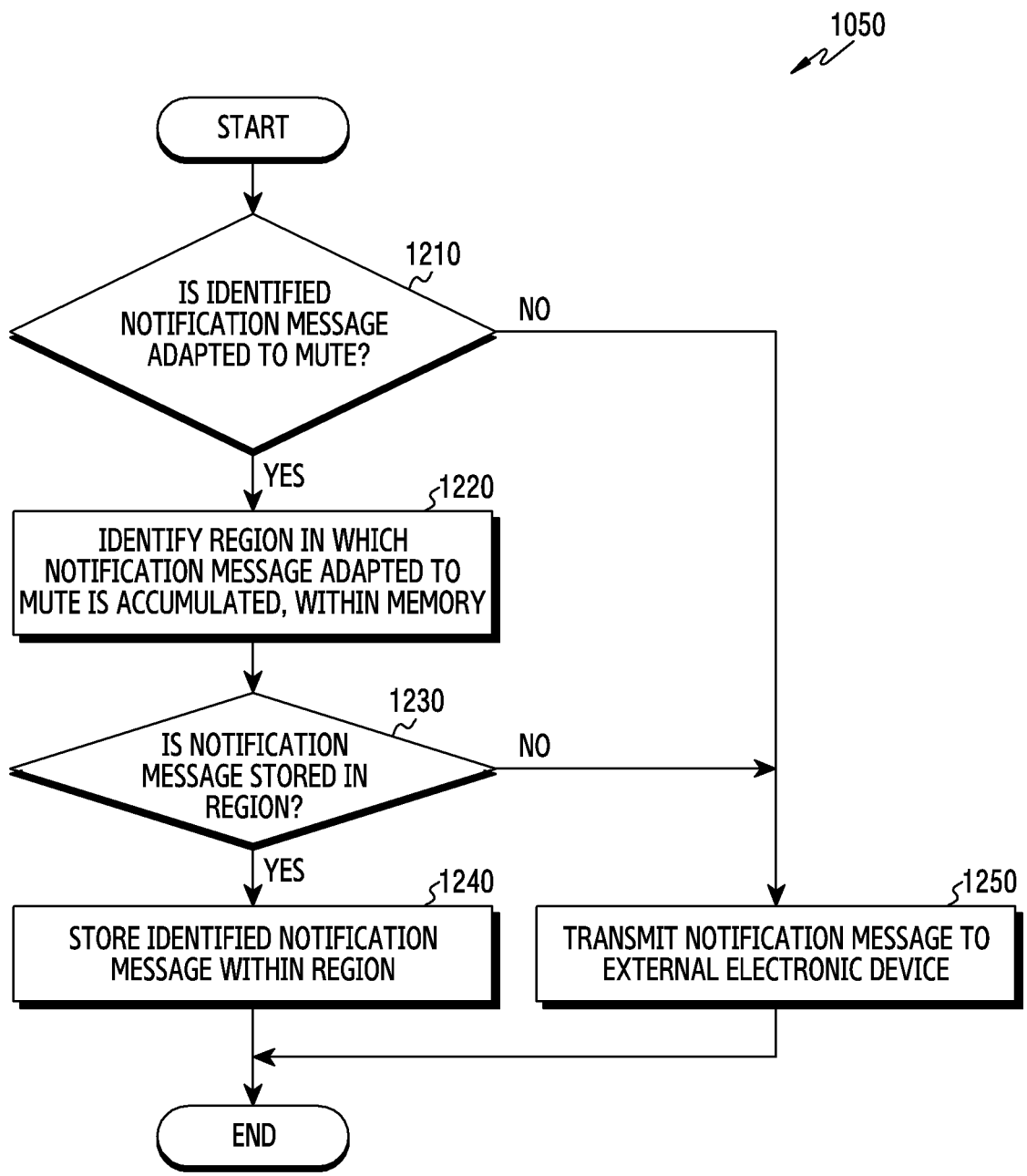
FIG. 12 is a flowchart illustrating an example operation in which the electronic device of FIG. 10 conditionally transmits a notification message according to various embodiments.

FIG. 12 is a flowchart 1050 illustrating an example operation in which the electronic device of FIG. 10 conditionally transmits a notification message according to various embodiments. The electronic device of FIG. 12 may correspond to the first electronic device 101 of FIG. 3. An external electronic device of FIG. 12 may correspond to the second electronic device 310 of FIG. 3. The operation of FIG. 12 may be performed by a processor (for example, the processor 120 of FIG. 3) of the electronic device. The operation of FIG. 12 may be related with the external device manager 1110 of FIG. 11. At least one of operations of FIG. 12 may be related with operation 1050 of FIG. 10. In various embodiments, while a state of the external electronic device corresponds to a sleep state, the electronic device may perform at least one of operations of FIG. 12.

Referring to FIG. 12, in operation 1210, the electronic device of various embodiments may identify whether a notification message identified from an application or network is a notification message adapted to mute. The notification message may be identified based on the external device manager 1110. For example, the electronic device may identify the notification message sent from the notification manager 217 to the external device manager 1110. Within the identified notification message, the electronic device may identify a form of external output required by the notification message.

For example, in response to identifying of a state of the external electronic device corresponding to an inactive state, the electronic device may identify at least one of an information signal, a voice information signal or a vibration information signal that are displayed in at least a portion of a display, included in the notification message. The signal may be included directly within the notification message, or be included in the form of a flag activating the output of the signal, within the notification message.

In response to identifying of at least one of the information signal, the voice information signal and the vibration information signal that are displayed in the at least portion of the display, in operation 1250, the electronic device of various embodiments may send the identified notification message to the external electronic device. For example, a notification message not adapted to mute may be sent to the external electronic device directly after being identified by the electronic device, independently from whether the state of the processor of the external electronic device is the sleep state or the active state. For example, although transmission of the notification message to the external electronic device is restricted when the state of the processor of the external electronic device is the sleep state, the electronic device may instantly send the external electronic device the notification message not adapted to mute. In some embodiments, the electronic device may identify (or determine) that the state of the processor of the external electronic device maintains the active state during a designated time while instantly sending the notification message not adapted to mute.

According to various embodiments, before transmitting the notification message to the external electronic device, the electronic device may identify whether to instantly send the notification message based on an attribute of the notification message. In response to the notification message requesting for designated external output (e.g., the activation of at least one of a display, a vibration, and/or a speaker), the notification message may be instantly sent to the external electronic device. In response to the notification message not requesting for the designated external output, the electronic device may store the notification message within the memory (for example, a database managed by the external device manager 1110 of FIG. 11) of the electronic device, without sending the notification message to the external electronic device, until satisfying a designated condition.

The designated condition may include (1) where the electronic device identifies another notification message requiring external output and (2) where a user gains access to the notification message by using the external electronic device (for example, where the user performs a wake-up motion for the external electronic device). In response to satisfying the condition, after firstly sending the external electronic device a notification message (for example, the another notification message requiring the external output) needed to be instantly transmitted, the electronic device may thereafter send the external electronic device the notification message stored within the memory.

In response to the notification message being the notification message adapted to mute, in operation 1220, the electronic device of various embodiments may identify a region storing a notification message adapted to mute, within the memory. For example, in response to no one of the information signal, the voice information signal and the vibration information signal displayed in the at least portion of the display not being identified from the notification message, the electronic device may identify the notification message as the notification message adapted to mute. The region storing the notification message may correspond to a database managed by the external device manager 1110. The region storing the notification message may be activated in response to identifying of the state of the external electronic device corresponding to the inactive state. The region storing the notification message may be a region adapted to store a notification message including a designated value (for example, a value indicating mute or non-requirement of external output).

Referring to FIG. 12, in operation 1230, the electronic device of various embodiments may identify whether the notification message has been stored within the identified region of the memory. For example, the electronic device may identify whether the notification message has been stored in the database managed by the external device manager 1110. For example, the electronic device may identify whether a designated region of the memory storing a pending mute notification message has been initialized.

In response to the identifying of the region corresponding to an initialized state, in operation 1250, the electronic device of various embodiments may send the identified notification message to the external electronic device, despite the restriction of transmission to the external electronic device. In response to the notification message not having been stored in the identified region within the memory, the electronic device may send the mute notification message to the external electronic device. In various embodiments, by sending the mute notification message in response to identifying of the region corresponding to the initialized state, the electronic device may notify the external electronic device of the pending of the notification message.

For example, the mute notification message sent to the external electronic device in response to identifying of the region corresponding to the initialized state may be used to notify the external electronic device of the transmission restriction and pending of another mute notification message subsequent to the mute notification message. In response to reception of the mute notification message, for example, the external electronic device may identify that a synchronization of the notification message is needed, based on operations 610 and 620 of FIG. 6. After transmission of the mute notification message, the synchronization of the notification message may be performed by (1) the activation of the external electronic device by the user or (2) the transmission of another notification message not adapted to mute.

In response to the notification message having been stored in the identified region within the memory, in operation 1240, the electronic device of various embodiments may store the identified notification message in the designated region of the memory. The transmission of the notification message may be restricted. For example, the electronic device may store a notification message whose transmission to the external electronic device is restricted. Referring to FIG. 12, in response to the state of the processor of the external electronic device being the sleep state, the electronic device may store notification messages other than (1) a notification message not adapted to mute and (2) a firstly generated notification message among a notification message adapted to mute. Below, an operation in which the electronic device stores the notification message within the memory based on operation 1240 is described in detail.

Figure 13A:
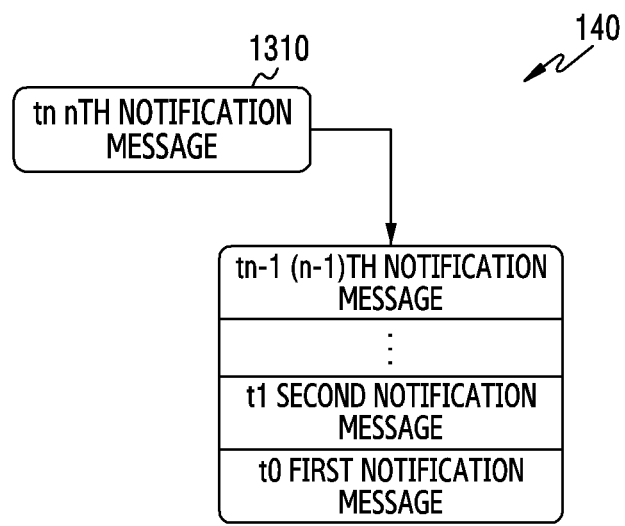
FIG. 13A is a diagram illustrating an example operation in which an electronic device accumulates a notification message within a memory according to various embodiments.
Figure 13B:
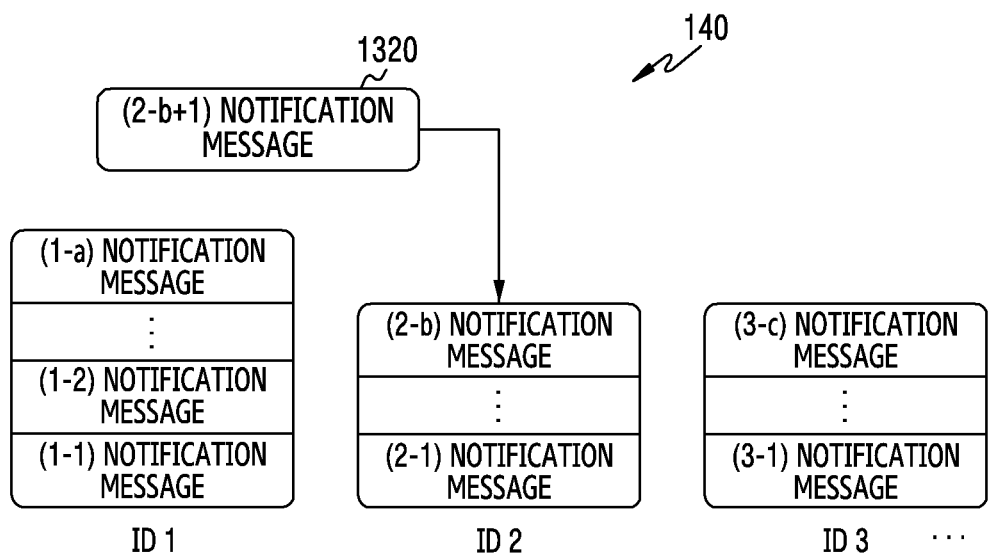
FIG. 13B is a diagram illustrating an example operation in which an electronic device accumulates a notification message within a memory according to various embodiments.

FIG. 13A is a diagram illustrating an example operation in which an electronic device accumulates a notification message within the memory 140 according to various embodiments. FIG. 13B is a diagram illustrating an example operation in which an electronic device accumulates a notification message within the memory 140 according to various embodiments. The electronic device of FIGS. 13A to 13B may correspond to the first electronic device 101 of FIG. 3. The memory 140 of FIGS. 13A to 13B may correspond to the memory 140 of FIG. 3. An operation of the electronic device of FIGS. 13A to 13B may be related with operation 1240 of FIG. 12.

The electronic device may store one or more mute notification messages based on a data structure corresponding to a stack within the memory 140. The electronic device may store the one or more mute notification messages within a database of the external device manager 1110 of FIG. 11. That the electronic device stores the mute notification message within the memory 140 may be performed while the state of the processor of the external electronic device is the sleep state.

Referring to FIG. 13A, the electronic device may store a second notification message within the memory 140, wherein the second notification message generated at a time point (t1) after a time point (t0) is sent to the external electronic device, ahead of a first notification message generated at the time point (t0). Similarly, the electronic device may store a plurality of notification messages within the memory 140, wherein a later generated notification message is sent to the external electronic device, ahead of a previously generated notification message. Referring to FIG. 13A, a firstly generated first notification message to an (n−1)th notification message may be accumulated within the memory 140 in a sequence of generation.

In response to an nth notification message 1310 identified at a time point (tn) after a time point (tn−1), the electronic device may store the nth notification message 1310 within the memory 140, wherein the nth notification message 1310 is sent to the external electronic device, ahead of the (n−1)th notification message. The first notification message to the nth notification message may be notification messages generated while the state of the processor of the external electronic device is the sleep state, and be notification messages adapted to mute. For example, a parameter corresponding to an alert type of the first notification message to the nth notification message may be "mute". The alert type may be varied according to user's setting (for example, when a user sets a notification of a specific chatting room to "off" in a messenger application) related with a notification message or the kind (for example, a system application) of an application corresponding to the notification message.

Referring to FIG. 13A, the electronic device may store one or more mute notification messages in sequence of time of identifying the mute notification messages. After the electronic device accumulates the mute notification message within the memory 140, in response to the state of the processor of the external electronic device being converted from the sleep state to an active state, the electronic device may send the external electronic device at least one of the mute notification messages accumulated within the memory 140. For example, according to various embodiments, the electronic device may send the external electronic device the accumulated mute notification messages in sequence starting from a firstly generated mute notification message. According to various embodiments, the electronic device may transmit the latest generated notification message to the external electronic device. According to various embodiments, the electronic device may transmit the latest generated notification message and the previously generated notification messages of a designated number to the external electronic device. While the electronic device sends the accumulated mute notification messages, a region of storing the mute notification message within the memory 140 may be initialized.

Referring to FIG. 13B, the electronic device may distinguish a mute notification message according to a time sequence and an identifier (ID) and store the same within the memory 140. The identifier of the notification message may be identified through an application corresponding to the notification message. For example, the identifier of the notification message may correspond to an identifier of the application. For example, the identifier of the notification message may correspond to the identifier customized by the application. For example, the electronic device may identify an identifier of a notification message identified from a messenger application, as an identifier of a chatting room corresponding to the notification message.

Referring to FIG. 13B, the electronic device may store one or more mute notification messages, based on one or more stacks distinguished by identifier of the mute notification message. In FIG. 13B, an mth mute notification message having an ID k as an identifier is illustrated as a (k-m) notification message. The electronic device may store the mute notification message within the memory 140 according to an identified time sequence. A (1-1) notification message to a (1-a) notification message having an ID 1 as an identifier may be stored in a region of the memory 140 corresponding to the ID 1 in sequence starting from a firstly generated notification message. A (2-1) notification message to a (2-b) notification message having an ID 2 as an identifier may be stored in a region of the memory 140 corresponding to the ID 2 in sequence starting from the firstly generated notification message. The region of the memory 140 corresponding to the ID 1 and the region of the memory 140 corresponding to the ID 2 may be distinguished from each other.

In response to identifying of a (2-b+1) notification message 1320, the electronic device may identify a region of the memory 140 corresponding to an identifier of the (2-b+1) notification message 1320. The (2-b+1) notification message 1320 may be a mute notification message having an ID 2 as an identifier. The ID 2 may be an identifier of an application or an identifier customized by the application. Referring to FIG. 13B, the electronic device may store the (2-b+1) notification message 1320 within a region of the memory 140 corresponding to the ID 2, wherein the (2-b+1) notification message 1320 is firstly output within the region of the memory 140 corresponding to the ID 2.

In response to a synchronization request related with a mute notification message of the external electronic device (for example, a request being based on operation 940 of FIG. 9) or identifying of another notification message not adapted to mute, the mute notification messages stored within the memory 140 based on FIGS. 13A to 13B may be sent to the external electronic device. In response to more mute notification messages than a designated threshold value being stored within the memory 140, the electronic device may send the external electronic device only some of the mute notification messages.

For example, among the mute notification messages stored within the memory 140, only the mute notification messages of a designated time or a designated number may be sent to the external electronic device. Referring to FIG. 13A, the electronic device may send the external electronic device mute notification messages (for example, a (n-k+1)th notification message to an nth notification message) of a designated k number.

For another example, the electronic device may send the external electronic device only a designated number of mute notification messages distinguished by identifier of the mute notification message. Referring to FIG. 13B, the electronic device may send the external electronic device only the latest generated (1-a) notification message among notification messages of an (a) number having an ID 1. Similarly, the electronic device may send the external electronic device only a (2-b+1) notification message 1320 among notification messages of a (b+1) number having an ID 2, and only a (3-c) notification message among notification messages of a c number having an ID 3. A sequence in which the electronic device sends the external electronic device the (1-a) notification message, the (2-b+1) notification message 1320, and the (3-c) notification message may be related with a sequence of time at which the notification messages are generated.

While the state of the processor of the external electronic device is the sleep state, the electronic device may accumulate a mute notification message within the memory 140 based on FIGS. 13A to 13B, whereby a frequency in which the external electronic device receives the mute notification message may be decreased. A frequency in which the state of the processor of the external electronic device is converted into the active state in response to the mute notification message can be decreased. Since the frequency of converting the state of the processor of the external electronic device into the active state is decreased, the external electronic device may save power consumption. Below, a description is made for an operation in which the electronic device sends one or more mute notification messages, which are accumulated within the memory 140 based on FIGS. 13A and 13B, to the external electronic device.

Figure 14:
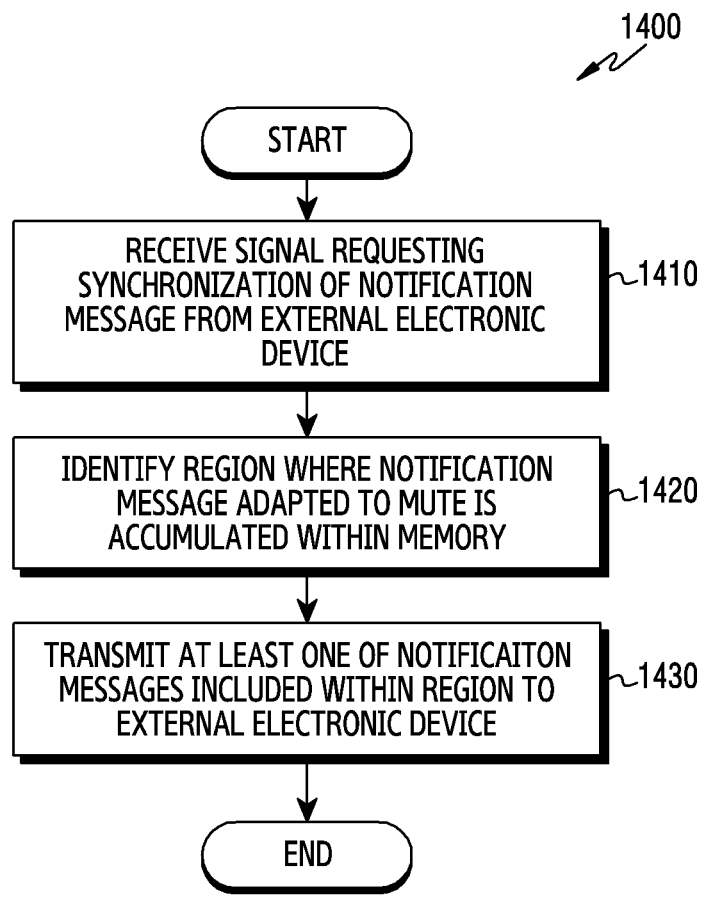
FIG. 14 is a flowchart illustrating an example operation in which an electronic device synchronizes a notification message in response to a request of an external electronic device according to various embodiments.

FIG. 14 is a flowchart 1400 illustrating an example operation in which an electronic device synchronizes a notification message in response to a request of an external electronic device according to various embodiments. The electronic device of FIG. 14 may correspond to the first electronic device 101 of FIG. 3. The electronic device of FIG. 14 may correspond to the second electronic device 310 of FIG. 3. The operation of FIG. 14 may be performed by the first electronic device 101 of FIG. 3 or the processor 120 of FIG. 3.

Referring to FIG. 14, in operation 1410, the electronic device of various embodiments may receive a signal requesting synchronization of a notification message from the external electronic device. For example, the external electronic device may request for the synchronization of the notification message based on operation 930 of FIG. 9. For example, after a mute notification message is sent to the external electronic device of a sleep state based on FIG. 12, in response to reception of another notification message requiring external output or a user's motion related with wake-up of the external electronic device, the external electronic device may request the electronic device for the synchronization of the notification message. For example, the electronic device may receive a request related with notification messages whose transmission is restricted from the external electronic device.

In response to a signal requesting synchronization of the notification message received from the external electronic device, in operation 1420, the electronic device of various embodiments may identify a region in which a notification message adapted to mute is accumulated within the memory. For example, the electronic device may identify a database managed by the external device manager 1110 of FIG. 11 or a region of the memory corresponding to the database.

Within the identified region of the memory, one or more notification messages adapted to mute may be stored based on the operations explained in FIGS. 13A and 13B.

Referring to FIG. 14, in operation 1430, the electronic device of various embodiments may send at least one of the notification messages included within the identified region to the external electronic device. In response to receiving a request related with a notification message including a designated value (for example, a value corresponding to a mute notification message) from the external electronic device, the electronic device may identify one or more notification messages stored in the designated region of the memory. For example, the electronic device may identify one or more mute notification messages which are accumulated based on the operations explained in FIGS. 13A and 13B. In response to receiving the request related with the notification message including the designated value from the external electronic device, the electronic device may send one or more notification messages stored within the identified region to the external electronic device.

Within the identified region, the mute notification messages identified while the external electronic device is in the sleep state may be stored by identifier of the mute notification message in sequence of time of identifying the mute notification message. In response to identifying a plurality of notification messages within the identified region, the electronic device may send the external electronic device the plurality of notification messages, according to a sequence associated with time at which each of the plurality of notification messages is generated. In response to identifying the plurality of notification messages whose transmission is restricted within the identified region, the electronic device may send the external electronic device notification messages of a designated number based on each of a plurality of identifiers identified in each of the plurality of notification messages.

According to various embodiments, the electronic device may transmit the latest generated notification message to the external electronic device. According to various embodiments, the electronic device may transmit the latest generated notification message and the previously generated notification messages of a designated number to the external electronic device. For example, in response to a plurality of mute notification messages having different IDs being accumulated in the first electronic device 101, the electronic device may transmit (1-a) data, (2-b) data and (3-c) data. Referring to FIG. 14, in response to receiving a request related with notification messages whose transmission is restricted from the external electronic device, the electronic device may send the external electronic device the one or more notification messages whose transmission is restricted. As the one or more notification messages whose transmission is restricted are sent, the notification messages may be synchronized between the electronic device and the external electronic device. A time point at which the notification messages are synchronized between the electronic device and the external electronic device may be after a state of a processor of the external electronic device is converted from a sleep state to an active state.

Figure 15A:
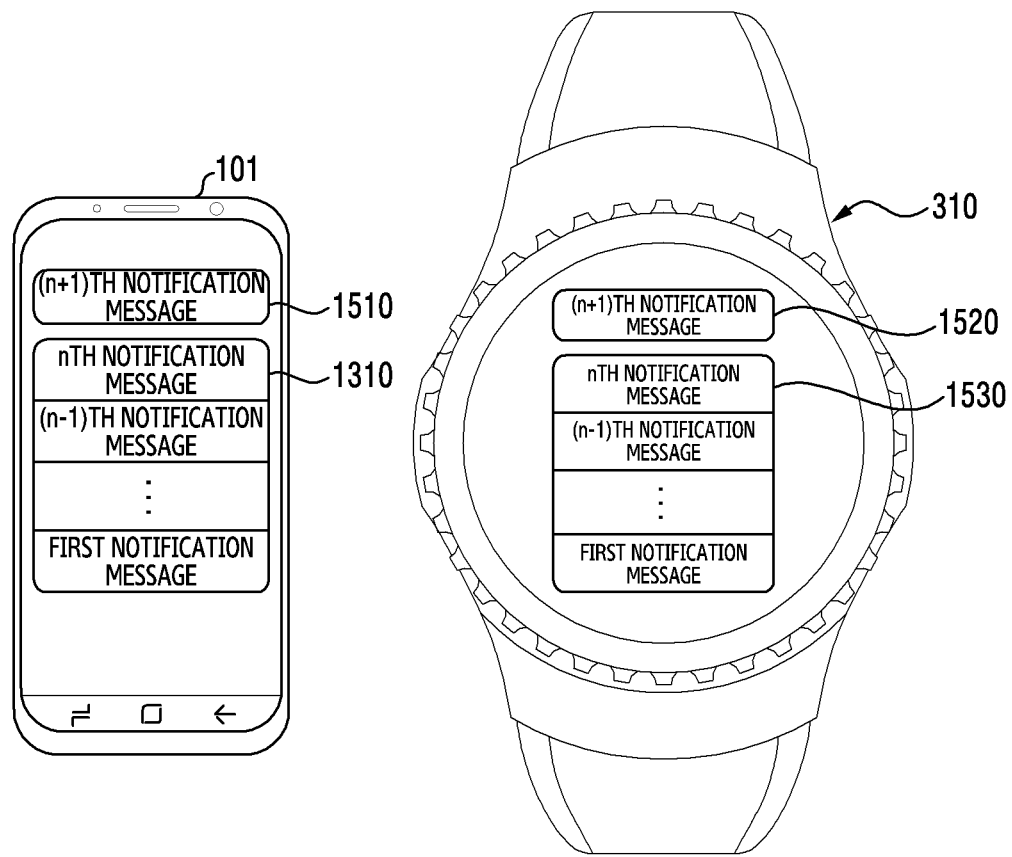
FIG. 15A is a diagram illustrating an example operation in which a first electronic device and a second electronic device synchronize a notification message according to various embodiments.
Figure 15B:
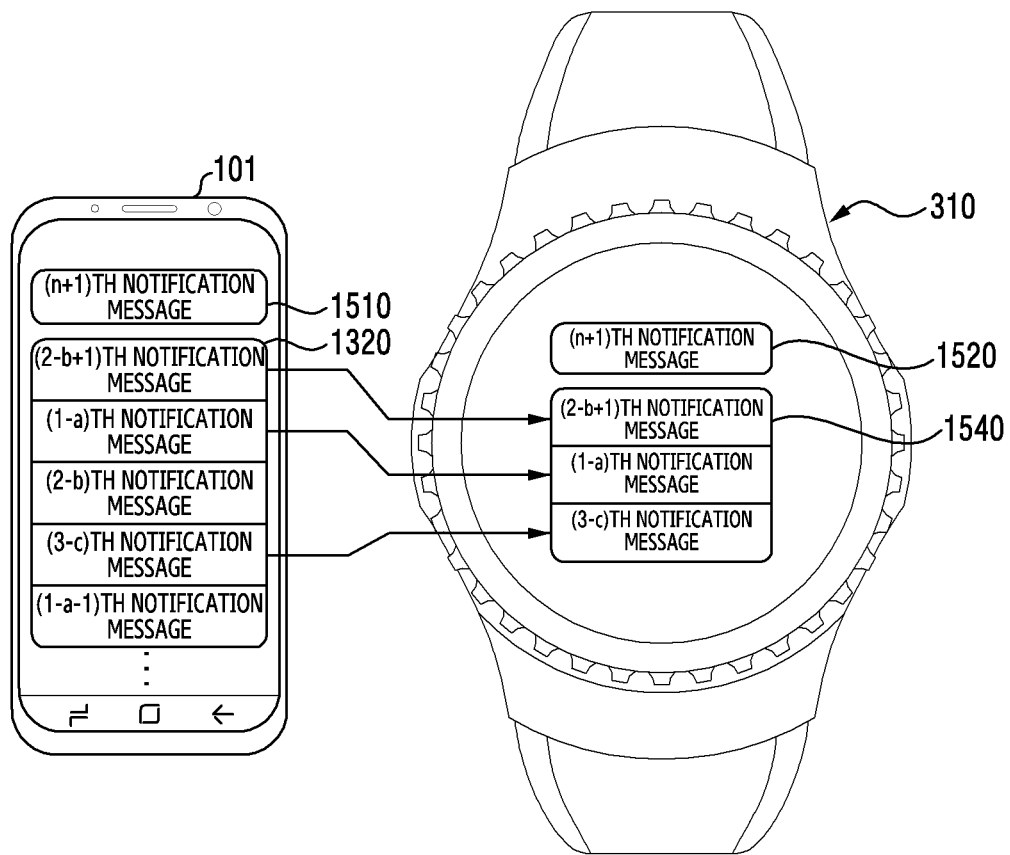
FIG. 15B is a diagram illustrating an example operation in which a first electronic device and a second electronic device synchronize a notification message according to various embodiments.

FIG. 15A is a diagram illustrating an example operation in which the first electronic device 101 and the second electronic device 310 synchronize a notification message according to various embodiments. FIG. 15B is a diagram illustrating an example operation in which the first electronic device 101 and the second electronic device 310 synchronize a notification message according to various embodiments. Each of the first electronic device 101 and the second electronic device 310 of FIGS. 15A to 15B may correspond to each of the first electronic device 101 and the second electronic device 310 of FIG. 3. The first electronic device 101 of FIGS. 15A to 15B may correspond to the electronic device of FIG. 10 to FIG. 14, and the second electronic device 310 of FIGS. 15A to 15B may correspond to the external electronic device of FIG. 10 to FIG. 14.

Referring to FIG. 15A, while a state of a processor of the second electronic device 310 is a sleep state, the first electronic device 101 may identify a first notification message to an nth notification message. The first notification message to the nth notification message may be notification messages adapted to mute. For example, an alert type of the first notification message to the nth notification message may be "mute". The first electronic device 101 may output the identified first notification message to nth notification message to a user, using visual objects 1310.

Based on the operation of FIG. 12, the first electronic device 101 may transmit the firstly generated first notification message among the first notification message to the nth notification message to the external electronic device, and store a second notification message to the nth notification message in a memory of the first electronic device 101. For example, the first electronic device 101 may, similarly with FIG. 15A, store the second notification message to the nth notification message in the memory of the first electronic device 101. The second notification message to the nth notification message may be stored in sequence of time at which the notification message is generated, in the memory of the first electronic device 101.

Referring to FIG. 15A, after identifying of the first notification message to the nth notification message, the first electronic device 101 may identify an (n+1)th notification message. The (n+1)th notification message, a notification message not adapted to mute, may be a notification message requiring external output. For example, an alert type of the (n+1)th notification message may not be "mute". For example, the (n+1)th notification message may include a parameter related with at least one of output of a visual object 1510, output of a voice signal, output of a vibration signal, and activation of an LED. The first electronic device 101 may output the visual object 1510 corresponding to the (n+1)th notification message, over the visual objects 1310 corresponding to the first notification message to nth notification message within the display.

Referring to FIG. 15A, although the state of the processor of the second electronic device 310 is the sleep state, the first electronic device 101 may send the (n+1)th notification message requiring external output to the second electronic device 310. In response to reception of the (n+1)th notification message, the state of the processor of the second electronic device 310 may be changed from the sleep state to the active state. The second electronic device 310 may output the visual object 1520 corresponding to the received (n+1)th notification message within the display.

In response to the first electronic device 101 sending the firstly generated first notification message among the first notification message to nth notification message to the external electronic device, and storing the second notification message to nth notification message within the memory of the first electronic device 101, the second electronic device 310 may, while outputting the visual object 1520 corresponding to the (n+1)th notification message, request the first electronic device 101 for transmission of one or more notification messages generated between the first notification message and the (n+1)th notification message.

In response to the request of the second electronic device 310, the first electronic device 101 may send the second electronic device 310 at least one of the second notification message to the nth notification message stored within the memory. After reception of the (n+1)th notification message, the second electronic device 310 may receive the second notification message to the nth notification message. The second electronic device 310 may output visual objects 1530 corresponding to the first notification message to nth notification message, after the visual object 1520 corresponding to the (n+1)th notification message. For example, referring to FIG. 15A, the second electronic device 310 may output the visual objects 1530 corresponding to the first notification message to nth notification messages, under the visual object 1520 corresponding to the (n+1)th notification message. A sequence in which the visual objects 1530 and 1520 corresponding to the first notification message to the (n+1)th notification message are output within the second electronic device 310 is not limited to FIG. 15A.

According to some embodiments, in response to identifying of the plurality of notification messages having mutually different identifiers (IDs) stored in the memory, the first electronic device 101 may send the second electronic device 310 only the latest generated notification message or notification messages of a designated number based on each of the identifiers. Referring to FIG. 15B, an mth mute notification message having an ID k as an identifier is illustrated as a (k-m)th notification message. After the state of the processor of the second electronic device 310 is changed into the sleep state, a plurality of mute notification messages having mutually different IDs may be accumulated in the first electronic device 101. The first electronic device 101 may output visual objects 1320 corresponding to the respective plurality of mute notification messages within the display, based on a sequence in which the plurality of mute notification messages are generated. The mute notification messages corresponding to the respective visual objects 1320 may, for example, be accumulated within the memory of the first electronic device 101 as in FIG. 15B.

Similarly, the first electronic device 101 may send the second electronic device 310 an (n+1)th notification message which is identified after the plurality of mute notification messages and which requires external output. In response to reception of the (n+1)th notification message, the second electronic device 310 may request the first electronic device 101 for transmission of the mute notification message which is generated until before the (n+1) notification message after the state of the processor of the second electronic device 310 is changed into the sleep state. The first electronic device 101 may send mute notification messages of a designated number among the plurality of mute notification messages having the mutually different IDs, to the second electronic device 310, on a per-ID basis.

For example, the first electronic device may send the second electronic device 310 the latest generated (2-b+1)th notification message among mute notification messages having an ID 2, and the latest generated (1-a)th notification message among mute notification messages having an ID 1, and the latest generated (3-c)th notification message among mute notification messages having an ID 3. The second electronic device 310 may output visual objects 1540 corresponding to the (2-b+1)th notification message and (3-c)th notification message, after the visual object 1520 corresponding to the (n+1)th notification message, wherein the (2-b+1)th notification message and the (3-c)th notification message have lower order of priority than the (n+1)th notification message.

Figure 16:
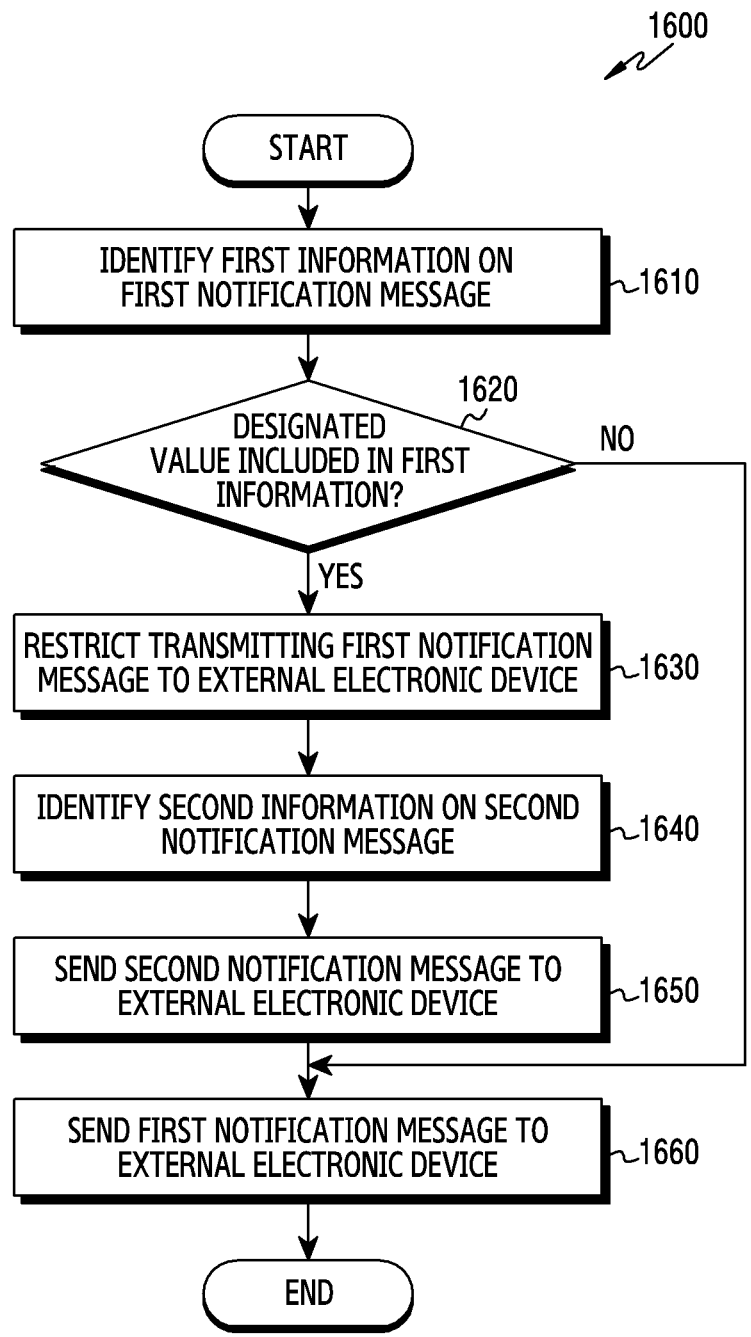
FIG. 16 is a flowchart illustrating an example operation in which an electronic device continuously processes identified notification messages according to various embodiments.

FIG. 16 is a flowchart 1600 illustrating an example operation in which an electronic device continuously processes identified notification messages according to various embodiments. The electronic device of FIG. 16 may correspond to the first electronic device 101 of FIG. 3. The external electronic device of FIG. 16 may correspond to the second electronic device 310 of FIG. 3. The operation of FIG. 16 may be performed by the first electronic device 101 of FIG. 3 or the processor 120 of FIG. 3.

Referring to FIG. 16, in operation 1610, the electronic device of various embodiments may identify first information on a first notification message, from at least one of one or more applications. The one or more applications may be installed in the electronic device. The first information may represent at least one of external output related with the first notification message, and/or an alert type of the first notification message.

Referring to FIG. 16, in operation 1620, the electronic device of various embodiments may identify whether a designated value is included in the first information. The designated value may correspond to a value indicating that the alert type of the first notification message is mute. In response to the designated value being included in the first information, the electronic device may identify that the first notification message corresponds to a mute notification message. Operation 1620 may correspond to operation 1210 of FIG. 12.

For example, in response to obtaining the designated value related with mute from the first information, the electronic device may identify another notification message being stored in a designated region of a memory and including the designated value. In response to identifying of the another notification message, the electronic device may restrict transmission of the first notification message.

In response to the designated value not being included in the first information, in operation 1660, the electronic device of various embodiments may send the first notification message to the external electronic device. For example, in response to the first notification message not being the mute notification message, the electronic device may send the first notification message to the external electronic device. In response to the designated value not being included in the first information, the electronic device may not restrict the transmission of the first notification message. In some embodiments, the first notification message may be output, without substantial time difference, from both the electronic device and the external electronic device.

In response to obtaining the designated value from the identified first information, in operation 1630, the electronic device of various embodiments may restrict transmitting the first notification message to the external electronic device. The electronic device may store the first notification message within the memory of the electronic device, based on an operation subsequent to operation 1220 of FIG. 12. The first notification message may be stored within the memory wherein the first notification message is sent ahead of another notification message previously generated ahead of the first notification message. In some embodiments, in response to the first notification message being a firstly generated notification message including the designated value after conversion of the external electronic device into a sleep state, the electronic device may, despite operation 1630, send the first notification message to the external electronic device.

Referring to FIG. 16, in operation 1640, the electronic device of various embodiments may identify second information on a second notification message, from at least one of the one or more applications. The second notification message may be a notification message identified or generated after the first notification message. The second information may represent at least one of external output related with the second notification message, and/or an alert type of the second notification message. The second information may include a value different from the designated value included in the first information. For example, the second information may represent output of a visual object related with the second notification message.

In response to obtaining the value different from the designated value from the identified second information, in operation 1650, the electronic device of various embodiments may send the second notification message to the external electronic device. The external electronic device may output the visual object related with the second notification message within a display of the external electronic device, based on the second information on the second notification message.

In response to transmission of the second notification message, in operation 1660, the electronic device of various embodiments may send the first notification message to the external electronic device. The external electronic device may receive the first notification message after reception of the second notification message. The external electronic device may output a visual object corresponding to the first notification message after the visual object corresponding to the second notification message.

Figure 17:
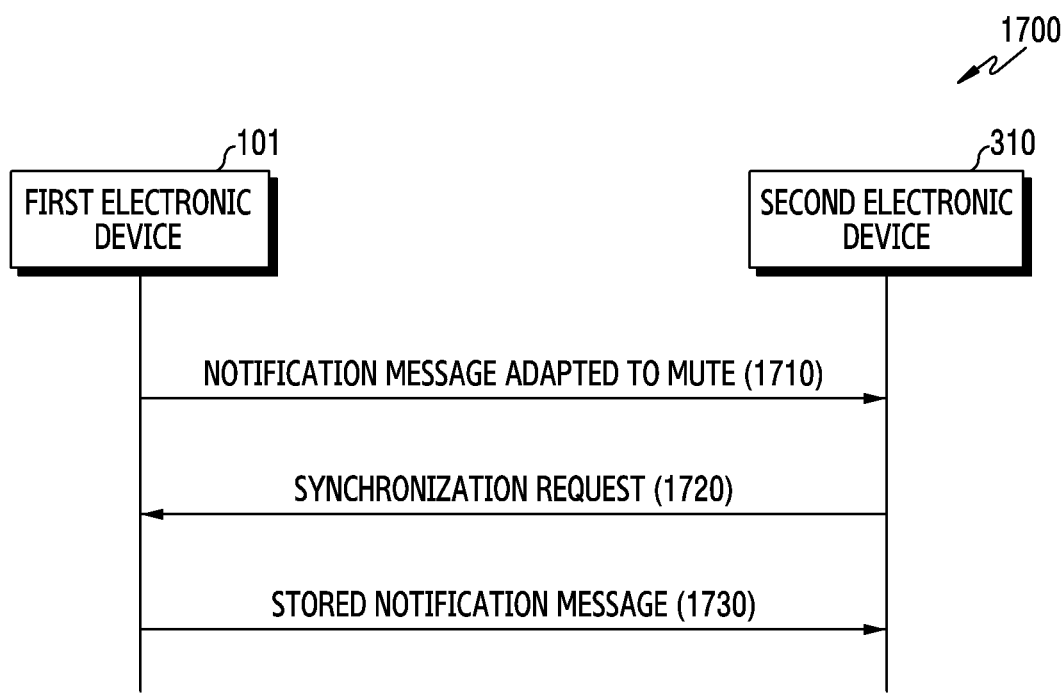
FIG. 17 is a sequence diagram illustrating example operation of a first electronic device and a second electronic device according to various embodiments.

FIG. 17 is a sequence diagram 1700 illustrating an example situation of the first electronic device 101 and the second electronic device 310 according to various embodiments. The first electronic device 101 and the second electronic device 310 of FIG. 17 may correspond to the first electronic device 101 and the second electronic device 310 of FIG. 3, respectively.

After a state of a processor of the second electronic device 310 enters a sleep state, the first electronic device 101 may identify a notification message 1710 adapted to mute. Based on at least one of the expiration of a timer related with the second electronic device 310 and a signal sent from the second electronic device 310, the first electronic device 101 may identify the state of the processor of the second electronic device 310. The notification message 1710 adapted to mute may be a mute notification message that is firstly generated after the state of the processor of the second electronic device 310 enters the sleep state.

The first electronic device 101 may send the second electronic device 310 the notification message 1710 adapted to mute. The first electronic device 101 may restrict the sending of a mute notification message that is identified after the notification message 1710 adapted to mute. The mute notification message whose sending is restricted may be accumulated within a memory of the first electronic device 101.

The second electronic device 310 receiving the notification message 1710 adapted to mute may be set to perform a synchronization of a notification message at a designated time point (for example, a time point of receiving another notification message requiring external output or a time point at which a user performs a motion related with wake-up of the second electronic device 310). The designated time point may correspond to a time point at which there is a need to provide a notification message to the user by using the second electronic device 310.

At the designated time point, the second electronic device 310 may send the first electronic device 101 a signal 1720 including a synchronization request. In response to the signal 1720, the first electronic device 101 may send the second electronic device 310 one or more notification messages 1730 stored within the memory of the first electronic device 101. In response to reception of the one or more notification messages 1730, the second electronic device 310 may output, within the display, visual objects corresponding to the respective one or more notification messages 1730, according to a sequence in which the one or more notification messages 1730 are generated.

Figure 18:
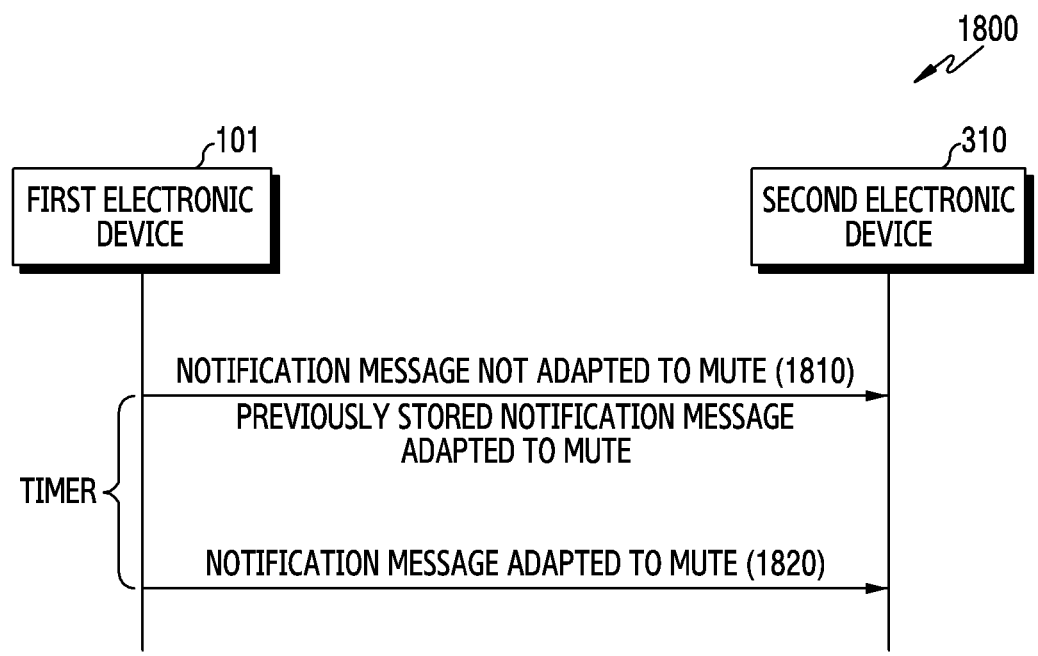
FIG. 18 is a sequence diagram illustrating example operation of a first electronic device and a second electronic device according to various embodiments.

FIG. 18 is a sequence diagram 1800 illustrating another example situation of the first electronic device 101 and the second electronic device 310 according to various embodiments. The first electronic device 101 and the second electronic device 310 of FIG. 18 may correspond to the first electronic device 101 and the second electronic device 310 of FIG. 3, respectively.

According to various embodiments, in response to a first notification message adapted to mute to an nth notification message being generated while a processor of the second electronic device 310 is in a sleep state, after the first electronic device 101 identifies a notification message 1810 being generated after the first notification message to nth notification message and requiring external output, the first electronic device 101 may transmit, to the second electronic device 310, the first notification message to the nth notification message in sequence starting from the latest generated nth notification message. After the sending of the notification message 1810 requiring the external output (e.g., not adapted to mute), the first notification message to the nth notification message may be sent to the second electronic device 310. The second electronic device 310 may output visual objects corresponding to the first notification message to the nth notification message, after a visual object corresponding to the notification message 1810 requiring the external output.

The first electronic device 101 may activate a timer having a designated time, together with the sending of the notification message 1810 requiring the external output. The designated time may correspond to time for which a state of a processor of the second electronic device 310 maintains an active state correspondingly to the notification message 1810. In response to a notification message identified before the timer expires, the first electronic device 101 may send the identified notification message to the second electronic device 310. For example, in response to a mute notification message 1820 identified before the timer expires, the first electronic device 101 may instantly send the mute notification message 1820 to the second electronic device 310.

According to various embodiments, the first electronic device 101 may differently control a time point of sending a notification message to the second electronic device 310, according to whether the notification message requires external output. In response to the notification message requiring the external output, the first electronic device 101 may instantly send the second electronic device 310 the notification message. In response to the notification message not requiring the external output, the first electronic device 101 may differently control a time point of sending the second electronic device 310 the notification message, according to whether the state of the processor of the second electronic device 310 is the active state. In response to the state of the processor of the second electronic device 310 being the active state, the first electronic device 101 may instantly send the second electronic device 310 the notification message not requiring the external output. In response to the state of the processor of the second electronic device 310 being the sleep state, the first electronic device 101 may restrict the sending of the notification message not requiring the external output. The sending of the notification message not requiring the external output may be controlled to be performed after the state of the processor of the second electronic device 310 is changed into the active state.

According to various embodiments, the first electronic device 101 may differently control a time point of sending a notification message to the second electronic device 310, according to the state of the processor of the second electronic device 310. In response to the state of the processor of the second electronic device 310 being the active state, the first electronic device 101 may instantly send the notification message to the second electronic device 310. In response to the state of the processor of the second electronic device 310 being the sleep state, the first electronic device 101 may selectively send the second electronic device 310 the notification message requiring the external output. In response to the state of the processor of the second electronic device 310 being the sleep state, the first electronic device 101 may instantly send the second electronic device 310 a firstly generated notification message among a plurality of notification messages not requiring external output. In response to the firstly generated notification message, the second electronic device 310 may identify to perform a synchronization of a notification message at a designated time point (for example, a time point of receiving another notification message requiring external output or a time point at which a user activates the second electronic device 310).

Methods of embodiments mentioned in the claims or specification of the disclosure may be implemented in the form of hardware, software, or a combination of the hardware and the software.

In response to being implemented by the software, a computer-readable storage media storing one or more programs (e.g., software modules) may be provided. The one or more programs stored in the computer-readable storage media are configured to be executable by one or more processors within an electronic device. The one or more programs include instructions for enabling the electronic device to execute the methods of the embodiments stated in the claims or the disclosure.

These programs (e.g., software modules and/or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. The program may be stored in a memory that is constructed in combination of some or all of them. Also, each constructed memory may be included in plural as well.

Also, the program may be stored in an attachable storage device that may access through a communication network such as the Internet, an intranet, a local area network (LAN), a wireless LAN (WLAN) or a storage area network (SAN), or a communication network configured in combination of them. This storage device may connect to a device performing an embodiment of the disclosure through an external port. Also, a separate storage device on the communication network may connect to the device performing the embodiment of the disclosure as well.

While various example embodiments have been illustrated and described, it will be understood by those skilled in the art that the various example embodiments are intended to be illustrative, not limiting, and that various changes in form and details may be made without departing from the true spirit and full scope of the disclosure, which may be defined, for example, in the appended claims and equivalents thereof.

What is claimed is:

1. An electronic device comprising:
   a memory configured to store one or more applications;
   communication circuitry configured to establish a wireless connection with an external electronic device; and
   a processor operatively coupled with the memory and the communication circuitry,
   wherein the memory stores instructions which, when executed, are configured to cause the processor to control the electronic device to:
      identify information on a notification message from at least one of the one or more applications;
      in response to acquiring a designated value from the identified information, cause the notification message to be transmitted to the external electronic device when feedback of the notification message is immediately required;
      cause the notification message to be stored in a designated region in the memory when feedback of the notification message is not immediately needed; and
      in response to receipt of a signal requesting synchronization from the external electronic device, cause the notification message stored in the designated region to be transmitted to the external electronic device.

2. The electronic device of claim 1, wherein the instructions, when executed, cause the processor to control the electronic device to:
   identify a designated region set to store a notification message comprising the designated value within the memory in response to obtaining the designated value from the identified information;
   restrict transmission of the notification message in response to identifying a designated region in which another notification message generated from at least one of the one or more applications prior to the first notification message is stored; and
   transmit the notification message to the external electronic device in response to identifying the designated region in which the another notification message is not stored.

3. The electronic device of claim 1, wherein the instructions, when executed, are configured to cause the processor to control the electronic device to,
   after the notification message is transmitted to the external electronic device, cause other notification messages to be transmitted to the external electronic device for a predetermined period of time without the immediate feedback of the other notification messages.

4. The electronic device of claim 1, wherein the instructions, when executed, cause the processor to control the electronic device to: store the notification message whose transmission to the external electronic device is restricted within the designated region within the memory, and
   wherein the designated region is a region set to store a notification message comprising the designated value.

5. The electronic device of claim 4, wherein the instructions, when executed, cause the processor to control the electronic device to:
   identify a plurality of notification messages stored in the designated region in response to receiving a request related to the notification message comprising the designated value from the external electronic device; and
   transmit the plurality of notification messages to the external electronic device based on a sequence associated with a time at which the plurality of notification messages are each generated in response to identifying a plurality of notification messages within the designated region.

6. The electronic device of claim 5, wherein the instructions, when executed, cause the processor to control the electronic device to transmit the latest generated notification message based on each of the identifiers to the external electronic device in response to identifying the plurality of notification messages having mutually different identifiers within the designated region.

* * * * *